(12) United States Patent
Wray et al.

(10) Patent No.: US 11,300,957 B2
(45) Date of Patent: Apr. 12, 2022

(54) MULTIPLE OBJECTIVE EXPLANATION AND CONTROL INTERFACE DESIGN

(71) Applicants: Nissan North America, Inc., Franklin, TN (US); The University of Massachusetts, Boston, MA (US); Renault S.A.S., Boulogne-Billancourt (FR)

(72) Inventors: Kyle Hollins Wray, Fremont, CA (US); Stefan Witwicki, San Carlos, CA (US); Shlomo Zilberstein, Amherst, MA (US)

(73) Assignees: Nissan North America, Inc., Franklin, TN (US); The University of Massachusetts, Boston, MA (US); Renault S.A.S., Boulogne-Billancourt (FR)

( * ) Notice: Subject to any disclaimer, the term of this patent is extended or adjusted under 35 U.S.C. 154(b) by 272 days.

(21) Appl. No.: 16/727,038

(22) Filed: Dec. 26, 2019

(65) Prior Publication Data

US 2021/0200208 A1 Jul. 1, 2021

(51) Int. Cl.
*G05D 1/00* (2006.01)
*G08G 1/16* (2006.01)
(Continued)

(52) U.S. Cl.
CPC ....... *G05D 1/0088* (2013.01); *B60W 30/0953* (2013.01); *G08G 1/166* (2013.01); *G05D 1/0217* (2013.01); *G08G 1/167* (2013.01)

(58) Field of Classification Search
CPC .............. G05D 1/0088; G05D 1/0217; B60W 30/0953; B60W 60/0025; G08G 1/166; G08G 1/167
See application file for complete search history.

(56) References Cited

U.S. PATENT DOCUMENTS

| 4,751,570 A | 6/1988 | Robinson |
| 5,615,116 A | 3/1997 | Gudat et al. |
| (Continued) | | |

FOREIGN PATENT DOCUMENTS

| CN | 105620470 A | 6/2016 |
| CN | 105635849 A | 6/2016 |
| (Continued) | | |

OTHER PUBLICATIONS

Brechtel et al.; Probabilistic decision-making under uncertainty for autonomous driving using continuous POMDPs; In: 2014 IEEE 17th International Conference on Intelligent Transportation Systems (ITSC); Oct. 11, 2014.

(Continued)

*Primary Examiner* — Michael J Zanelli
(74) *Attorney, Agent, or Firm* — Young Basile Hanlon & MacFarlane, P.C.

(57) ABSTRACT

A vehicle traversing a vehicle transportation network may use a scenario-specific operational control evaluation model instance. A multi-objective policy for the model is received, wherein the policy includes at least a first objective, a second objective, and a priority of the first objective relative to the second objective. A representation of the policy (e.g., the first objective, the second objective, and the priority) is generated using a user interface. Based on feedback to the user interface, a change to the multi-objective policy for the scenario-specific operational control evaluation model is received. The change is to the first objective, the second objective, the priority, of some combination thereof. Then, for determining a vehicle control action for traversing the vehicle transportation network, an updated multi-objective policy for the scenario-specific operational control evaluation model is generated to include the change to the policy.

20 Claims, 13 Drawing Sheets

(51) Int. Cl.
*B60W 30/095* (2012.01)
*G05D 1/02* (2020.01)

(56) References Cited

U.S. PATENT DOCUMENTS

| | | |
|---|---|---|
| 8,762,006 B2 | 6/2014 | Miller |
| 8,781,669 B1 | 7/2014 | Teller et al. |
| 8,849,483 B2 | 9/2014 | Kuwata et al. |
| 8,884,782 B2 | 11/2014 | Rubin et al. |
| 9,081,651 B2 | 7/2015 | Filev et al. |
| 9,103,671 B1 | 8/2015 | Breed et al. |
| 9,494,439 B1 | 11/2016 | Ross et al. |
| 9,568,915 B1 | 2/2017 | Berntorp et al. |
| 9,646,428 B1 | 5/2017 | Konrardy et al. |
| 9,972,054 B1 | 5/2018 | Konrardy et al. |
| 10,029,701 B2 | 7/2018 | Gordon et al. |
| 10,061,326 B2 | 8/2018 | Gordon et al. |
| 10,093,322 B2 | 10/2018 | Gordon et al. |
| 10,126,135 B2 | 11/2018 | Mortazavi et al. |
| 10,185,998 B1 | 1/2019 | Konrardy et al. |
| 10,319,039 B1 | 6/2019 | Konrardy et al. |
| 10,380,886 B2 | 8/2019 | Ran et al. |
| 10,408,638 B2 | 9/2019 | Berntorp et al. |
| 10,514,705 B2 | 12/2019 | Shalev-Shwartz et al. |
| 10,538,252 B2 | 1/2020 | Ebina et al. |
| 10,599,155 B1 | 3/2020 | Konrardy et al. |
| 2004/0068351 A1 | 4/2004 | Solomon |
| 2005/0057370 A1 | 3/2005 | Warrior et al. |
| 2007/0021915 A1 | 1/2007 | Breed et al. |
| 2007/0168096 A1 | 7/2007 | Boutin |
| 2008/0097699 A1 | 4/2008 | Ono |
| 2009/0088916 A1 | 4/2009 | Elgersma et al. |
| 2009/0140887 A1 | 6/2009 | Breed et al. |
| 2009/0299496 A1 | 12/2009 | Cade |
| 2009/0326819 A1 | 12/2009 | Taguchi |
| 2010/0223216 A1 | 9/2010 | Eggert et al. |
| 2011/0016067 A1 | 1/2011 | Levchuk et al. |
| 2011/0102195 A1 | 5/2011 | Kushi et al. |
| 2012/0150437 A1 | 6/2012 | Zeng et al. |
| 2012/0233102 A1 | 9/2012 | James |
| 2012/0290152 A1 | 11/2012 | Cheung et al. |
| 2013/0318023 A1 | 11/2013 | Morimura et al. |
| 2014/0136414 A1 | 5/2014 | Abhyanker |
| 2014/0222277 A1 | 8/2014 | Tsimhoni et al. |
| 2014/0244114 A1 | 8/2014 | Matsubara |
| 2014/0309838 A1 | 10/2014 | Ricci |
| 2015/0039157 A1 | 2/2015 | Wolfe et al. |
| 2015/0070156 A1 | 3/2015 | Milburn, Jr. |
| 2015/0081156 A1 | 3/2015 | Trepagnier et al. |
| 2015/0105961 A1 | 4/2015 | Callow |
| 2015/0106010 A1 | 4/2015 | Martin et al. |
| 2015/0153735 A1 | 6/2015 | Clarke et al. |
| 2015/0183431 A1 | 7/2015 | Nanami |
| 2015/0210274 A1 | 7/2015 | Clarke et al. |
| 2015/0253772 A1 | 9/2015 | Solyom et al. |
| 2015/0329130 A1 | 11/2015 | Carlson et al. |
| 2015/0345966 A1 | 12/2015 | Meuleau |
| 2015/0345967 A1 | 12/2015 | Meuleau |
| 2015/0375748 A1 | 12/2015 | Nagase et al. |
| 2016/0068158 A1 | 3/2016 | Elwart et al. |
| 2016/0129907 A1 | 5/2016 | Kim et al. |
| 2016/0161270 A1 | 6/2016 | Okumura |
| 2016/0209842 A1 | 7/2016 | Thakur et al. |
| 2016/0209843 A1 | 7/2016 | Meuleau et al. |
| 2016/0209848 A1 | 7/2016 | Kojo et al. |
| 2016/0260328 A1 | 9/2016 | Mishra et al. |
| 2016/0318511 A1 | 11/2016 | Rangwala |
| 2016/0318515 A1 | 11/2016 | Laur et al. |
| 2016/0334230 A1 | 11/2016 | Ross et al. |
| 2016/0334797 A1 | 11/2016 | Ross et al. |
| 2016/0335892 A1 | 11/2016 | Okada et al. |
| 2016/0375766 A1 | 12/2016 | Konet et al. |
| 2016/0375768 A1 | 12/2016 | Konet et al. |
| 2017/0008168 A1 | 1/2017 | Weng et al. |
| 2017/0010108 A1 | 1/2017 | Shashua |
| 2017/0010617 A1 | 1/2017 | Shashua et al. |
| 2017/0031361 A1 | 2/2017 | Olson et al. |
| 2017/0032590 A1 | 2/2017 | Stefan et al. |
| 2017/0038777 A1 | 2/2017 | Harvey |
| 2017/0090478 A1 | 3/2017 | Blayvas et al. |
| 2017/0090480 A1 | 3/2017 | Ho et al. |
| 2017/0102700 A1 | 4/2017 | Kozak |
| 2017/0158193 A1 | 6/2017 | Lopez et al. |
| 2017/0215045 A1 | 7/2017 | Rasal et al. |
| 2017/0225760 A1 | 8/2017 | Sidki et al. |
| 2017/0236422 A1 | 8/2017 | Naka et al. |
| 2017/0261325 A1 | 9/2017 | Schroeder et al. |
| 2017/0262790 A1 | 9/2017 | Khasis |
| 2017/0276780 A1 | 9/2017 | Takehara et al. |
| 2017/0277193 A1 | 9/2017 | Frazzoli et al. |
| 2017/0297576 A1 | 10/2017 | Halder et al. |
| 2017/0329338 A1 | 11/2017 | Wei et al. |
| 2017/0334451 A1 | 11/2017 | Asakura et al. |
| 2017/0356746 A1 | 12/2017 | Iagnemma |
| 2017/0357263 A1* | 12/2017 | Glatfelter ............ G06K 9/0063 |
| 2017/0369051 A1 | 12/2017 | Sakai et al. |
| 2017/0369062 A1 | 12/2017 | Saigusa et al. |
| 2017/0369067 A1 | 12/2017 | Saigusa et al. |
| 2017/0371338 A1 | 12/2017 | Kamata et al. |
| 2018/0004214 A1 | 1/2018 | Wisniowski et al. |
| 2018/0011494 A1 | 1/2018 | Zhu et al. |
| 2018/0029500 A1 | 2/2018 | Katanoda |
| 2018/0032079 A1 | 2/2018 | Nishi |
| 2018/0046191 A1 | 2/2018 | Keller et al. |
| 2018/0129206 A1 | 5/2018 | Harada et al. |
| 2018/0173230 A1 | 6/2018 | Goldman-Shenhar et al. |
| 2018/0232585 A1 | 8/2018 | Kim |
| 2018/0290657 A1 | 10/2018 | Ryne et al. |
| 2018/0341880 A1 | 11/2018 | Kislovskiy et al. |
| 2018/0342033 A1 | 11/2018 | Kislovskiy et al. |
| 2018/0348786 A1 | 12/2018 | Yasui et al. |
| 2018/0349785 A1 | 12/2018 | Zheng et al. |
| 2018/0373245 A1 | 12/2018 | Nishi |
| 2019/0047584 A1 | 2/2019 | Donnelly |
| 2019/0096244 A1 | 3/2019 | Guruva Reddiar et al. |
| 2019/0113918 A1 | 4/2019 | England et al. |
| 2019/0129436 A1 | 5/2019 | Sun et al. |
| 2019/0135281 A1 | 5/2019 | Miura et al. |
| 2019/0196471 A1 | 6/2019 | Vaughn et al. |
| 2019/0295179 A1 | 9/2019 | Shalev-Shwartz et al. |
| 2019/0299991 A1 | 10/2019 | Horii et al. |
| 2019/0317506 A1 | 10/2019 | Ishioka |
| 2019/0329771 A1 | 10/2019 | Wray et al. |
| 2019/0329782 A1 | 10/2019 | Shalev-Shwartz et al. |
| 2019/0359209 A1 | 11/2019 | Mizutani et al. |
| 2020/0079377 A1 | 3/2020 | Yashiro et al. |
| 2020/0097008 A1 | 3/2020 | Sadat et al. |
| 2020/0180647 A1 | 6/2020 | Anthony |
| 2020/0269871 A1 | 8/2020 | Schmidt et al. |
| 2020/0269875 A1 | 8/2020 | Wray et al. |
| 2020/0279488 A1 | 9/2020 | Shibasaki |
| 2021/0237759 A1 | 8/2021 | Wray et al. |
| 2021/0240190 A1 | 8/2021 | Wray et al. |
| 2021/0294323 A1 | 9/2021 | Bentahar et al. |

FOREIGN PATENT DOCUMENTS

| | | |
|---|---|---|
| CN | 106103232 A | 11/2016 |
| CN | 106184223 A | 12/2016 |
| CN | 107577227 A | 1/2018 |
| DE | 10341753 A1 | 4/2005 |
| DE | 102012005245 A1 | 9/2012 |
| DE | 102012220134 A1 | 5/2014 |
| DE | 102016203086 A1 | 8/2017 |
| EP | 2084690 A2 | 8/2009 |
| EP | 2902864 A1 | 8/2015 |
| EP | 2958783 A1 | 12/2015 |
| EP | 3273423 A1 | 1/2018 |
| JP | H02-114304 A | 4/1990 |
| JP | 2007179388 A | 7/2007 |
| JP | 2012-221291 A | 11/2012 |
| JP | 2015-140181 A | 8/2015 |
| JP | 2015-199439 A | 11/2015 |
| JP | 2015191273 A | 11/2015 |

(56) References Cited

FOREIGN PATENT DOCUMENTS

| JP | 2016017914 A | 2/2016 |
|---|---|---|
| JP | 2016139163 A | 8/2016 |
| JP | 201781426 A | 5/2017 |
| JP | 2018-49445 A | 3/2018 |
| RU | 2436167 C1 | 12/2011 |
| WO | 2008/053373 A2 | 5/2008 |
| WO | 2012-172632 A1 | 12/2012 |
| WO | 2014/024336 A1 | 2/2014 |
| WO | 2014/130178 A1 | 8/2014 |
| WO | 2015/052865 A1 | 4/2015 |
| WO | 2015112651 A1 | 7/2015 |
| WO | 2016121572 A1 | 8/2016 |
| WO | 2016124178 A1 | 8/2016 |
| WO | 2016129067 A1 | 8/2016 |
| WO | 2016130719 A2 | 8/2016 |
| WO | 2017/013746 A1 | 1/2017 |
| WO | 2017/013749 A1 | 1/2017 |
| WO | 2017/022448 A1 | 2/2017 |
| WO | 2017/120336 A2 | 7/2017 |
| WO | 2018147872 A1 | 8/2018 |
| WO | 2018147874 A1 | 8/2018 |

OTHER PUBLICATIONS

Santana et al.; Robust Coordination of Autonomous Systems through Risk-sensitive, Model-based Programming and Execution; Massachusetts Inst of Tech Cambridge Computer Science and Artificial Intelligence Lab; Oct. 9, 2015.
Kala et al.; Motion Planning of Autonomous Vehicles on a Dual Carriageway without Speed Lanes; Electronics; Jan. 13, 2015.
Matthews et al.; Intent Communication between Autonomous Vehicles and Pedestrians; 2015.
Ragi et al.; UAV path planning in a dynamic environment via partially observable Markov decision process; IEEE Transactions on Aerospace and Electronic Systems; Oct. 8, 2013.
Aoki, S. et al., A Merging Protocol for Self-Driving Vehicles, ICCPS, Apr. 2017.
Chryssanthacopoulos et al., Decomposition Method for Optimized Collision Avoidance with Multiple Threats; DASC 2011, 30th IEEE/AIAA Digital Avionics Systems Conference, Oct. 16-20, 2011, 21 pages; https://ieeexplore.ieee.org/document/6095973.
Wray et al.. Online Decision-Making for Scalable Autonomous Systems; Conference: Twenty-Sixth International Joint Conference on Artificial Intelligence; Conference Paper—Aug. 2017 ; 7 pages https://www.researchgate.net/publication/318830226_Online_Decision-Making_for_Scalable_Autonomous_Systems.
Wray et al., Online Decision-Making for Scalable Autonomous Systems; Power Point Presentation; Aug. 23, 2017.
Miller, Tim, Explanation in Artificial Intelligence: Insights from the Social Sciences; Aug. 15, 2018; 66 pages; arXiv:1706.07269v3 ; https://arxiv.org/abs/1706.07269.
Bouton et al., Scalable Decision Making with Sensor Occlusions for Autonomous Driving; 2018 IEEE International Conference on Robotics and Automation (ICRA), Brisbane, Australia, May 21-25, 2018; 6 pages.
Brechtel et al., Probabilistic Decision-Making Under Uncertainty for Autonomous Driving Using Continuous POMPDs, 2014 IEEE 17th International Conference on Intelligent Transportation Systems, Oct. 8-11, 2014; pp. 392-399.
Bai et al., Intention-Aware Online POMPD Planning for Autonomous Driving in a Crowd; 2015 IEEE International Conference on Robotics and Automation; Washington State Convention Center, Seattle, Washington; May 26-30, 2015; pp. 454-460.
Extended European Search Report of corresponding application EP 17895657.9; dated Feb. 25, 2020; 9 pages.

* cited by examiner

MULTIPLE OBJECTIVE EXPLANATION AND CONTROL INTERFACE DESIGN

TECHNICAL FIELD

This disclosure relates to autonomous vehicle operational management and autonomous driving.

BACKGROUND

Autonomous vehicles may traverse a vehicle transportation network, which may include encountering distinct vehicle operational scenarios. The autonomous vehicles may traverse a current distinct vehicle operational scenario using a policy or solution for a model of the current distinct vehicle operational scenario. An autonomous vehicle may have limited resources for identifying distinct vehicle operational scenarios and generating or optimizing corresponding policies. Typical systems use single objective reasoning in decision making and do not consider riskiness/safety, social acceptability, or passenger preferences. The decision-making capability for typical systems is therefore limited.

SUMMARY

Disclosed herein are aspects, features, elements, implementations, and embodiments of scenario-specific operational control management with multiple objectives and an explanation and control interface design that may be used to explain, modify, control, and adapt decision making for passengers, developers, and remote assistance support of autonomous vehicles.

An aspect of the disclosed embodiments is a method for use with a vehicle in traversing a vehicle transportation network. The method includes receiving, from an instance of a scenario-specific operational control evaluation model of a distinct vehicle operational scenario, a multi-objective policy for the scenario-specific operational control evaluation model, wherein the multi-objective policy includes at least a first objective, a second objective, and a priority of the first objective relative to the second objective. The method also includes generating, using a user interface, a representation of the first objective, the second objective, and the priority of the first objective relative to the second objective, and receiving, based on feedback to the user interface, a change to the multi-objective policy for the scenario-specific operational control evaluation model, the change including at least one of a change of the first objective, a change of the second objective, or a change in the priority of the first objective relative to the second objective. The method also includes generating, for determining a vehicle control action for traversing the vehicle transportation network, an updated multi-objective policy for the scenario-specific operational control evaluation model to include the change to the multi-objective policy.

Another aspect of the disclosed embodiments is an apparatus for use with a vehicle traversing a vehicle transportation network. The apparatus includes a user interface and a processor. The processor is configured to receive, from an instance of a scenario-specific operational control evaluation model of a distinct vehicle operational scenario, a multi-objective policy for the scenario-specific operational control evaluation model, wherein the multi-objective policy includes at least a first objective, a second objective, and a priority of the first objective relative to the second objective, generate, using the user interface, a representation of the first objective, the second objective, and the priority of the first objective relative to the second objective, receive, based on feedback to the user interface, a change to the multi-objective policy for the scenario-specific operational control evaluation model, the change including at least one of a change of the first objective, a change of the second objective, or a change in the priority of the first objective relative to the second objective, and generate, for determining a vehicle control action for traversing the vehicle transportation network, an updated multi-objective policy for the scenario-specific operational control evaluation model to include the change to the multi-objective policy.

Another aspect of the disclosed embodiments is an autonomous vehicle that includes a user interface and a processor. The user interface is one or both of a graphical user interface or a microphone and a speaker. The processor is configured to receive, from an instance of a scenario-specific operational control evaluation model of a distinct vehicle operational scenario, a multi-objective policy for the scenario-specific operational control evaluation model. The multi-objective policy includes at least a first objective, a second objective, and a priority of the first objective relative to the second objective, the priority of the first objective relative to the second objective comprises a preference for the first objective over the second objective and a buffer value indicating a constraint applied to the preference within the scenario-specific operational control evaluation model, and the buffer value indicates how many units, of a defined measurement unit, that the scenario-specific operational control evaluation model will allow deviation from the second objective in favor of the first objective. The processor is also configured to generate, using the user interface, a representation of the first objective, the second objective, and the priority of the first objective relative to the second objective, receive, based on feedback to the user interface, a change to the multi-objective policy for the scenario-specific operational control evaluation model, the change including at least one of a change of the first objective, a change of the second objective, or a change in the priority of the first objective relative to the second objective, and generate, for determining a vehicle control action for traversing the vehicle transportation network, an updated multi-objective policy for the scenario-specific operational control evaluation model to include the change to the multi-objective policy.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings.

DETAILED DESCRIPTION

Vehicles, such as autonomous vehicles, or semi-autonomous vehicles, may traverse a vehicle transportation network. A semi-autonomous vehicle may be one that includes an advanced driver assist system (ADAS). An ADAS can automate, adapt and/or enhance vehicle systems for safety and better driving such as to circumvent and/or correct driver errors. Collectively, autonomous and semi-autonomous vehicles may be referred to as autonomous vehicles (AV) or simply vehicles herein. Traversing the vehicle transportation network may include traversing one or more distinct vehicle operational scenarios, such as pedestrian scenarios, intersection scenarios, lane change scenarios, or any other vehicle operational scenario or combination of vehicle operational scenarios.

An autonomous vehicle may traverse a current distinct vehicle operational scenario based on a policy or solution for a model, such as a Partially Observable Markov Decision Process (POMDP) model, of a respective distinct vehicle operational scenario. In some embodiments, the autonomous vehicle may electronically communicate with an external (e.g., centralized) scenario-specific operational control management device to identify distinct vehicle operational scenarios and to identify corresponding policy data for respective models of the distinct vehicle operational scenarios. The policy may be a multi-objective policy.

Multiple objectives can be a powerful solution to many AV decision-making challenges as described in more detail below. However, preferences of one objective over another, and how they affect the vehicle, are not easily understood by a user, whether the user is a driver, passenger, remote assistance support, or a developer. The interface described herein may be used to explain, modify, control, adapt, or otherwise manage competing objectives in the multi-objective policy for a scenario-specific operational control evaluation model. Additional details are discussed below after a description of an environment in which aspects of the teachings herein may be implemented.

Figure 1:
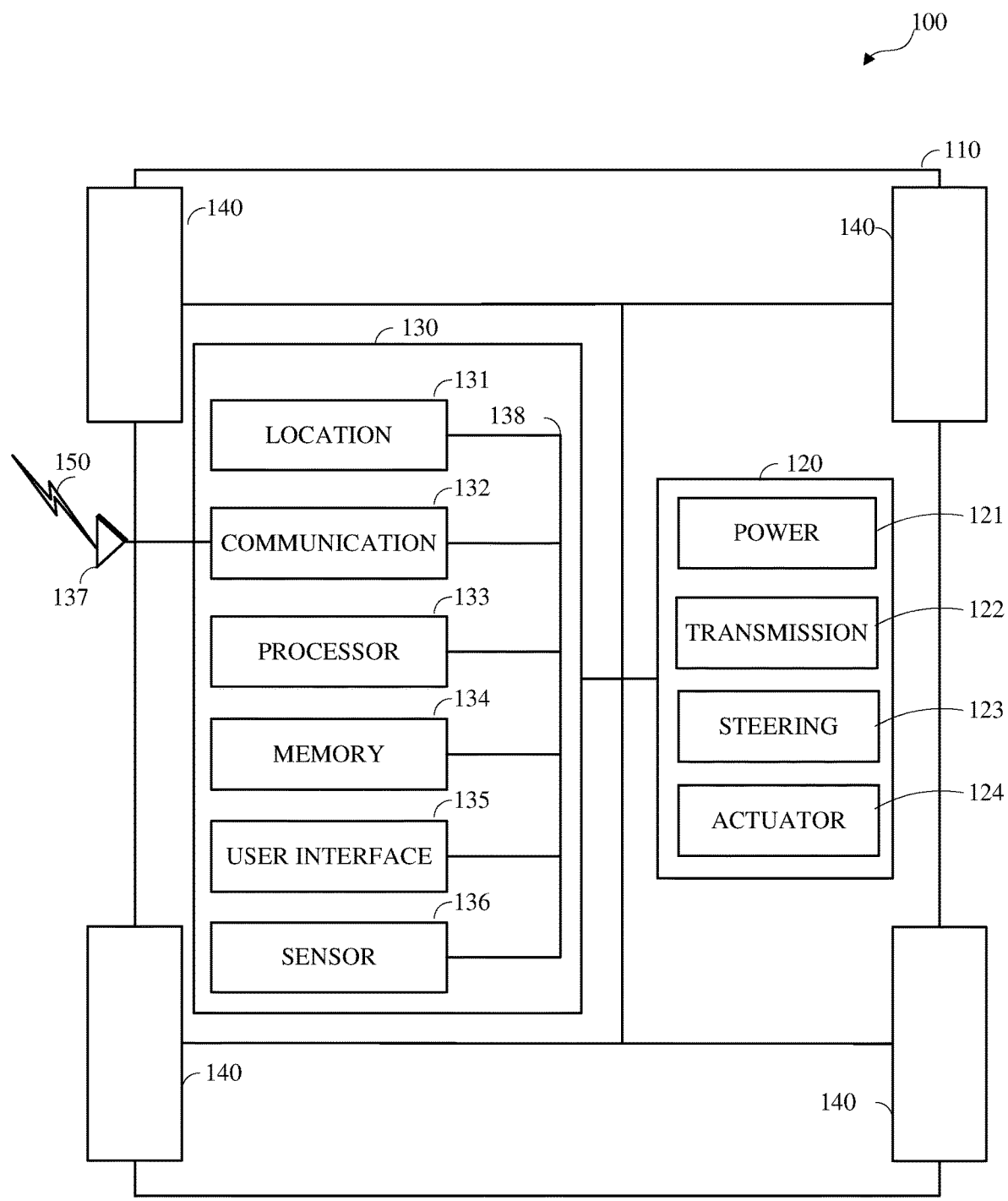
FIG. 1 is a diagram of an example of a vehicle in which the aspects, features, and elements disclosed herein may be implemented.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor, and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or speed, of the vehicle 100. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communication with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle.

The autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network data representing the vehicle transportation network, or a combination thereof, and may control or operate the vehicle 100 to traverse the vehicle transportation network in accordance with the route. For example, the autonomous vehicle control unit may output the route of travel to the trajectory controller, and the trajectory controller may operate the vehicle 100 to travel from the origin to the destination using the generated route.

Figure 2:
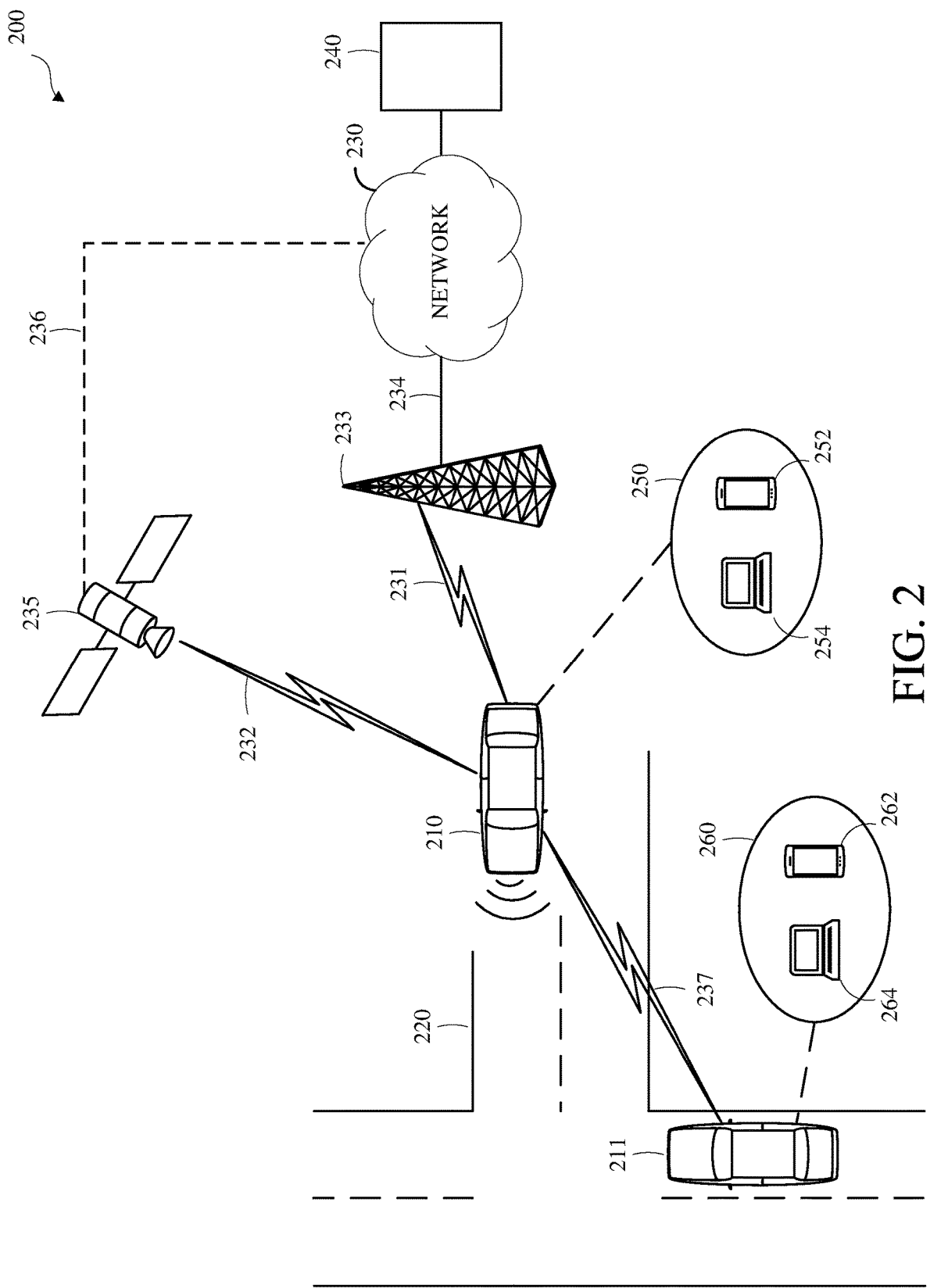
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/2110. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250/260, such as a driver, operator, or owner of the vehicle. In some embodiments, an entity 250/260 associated with a vehicle 210/211 may be associated with one or more personal electronic devices 252/254/262/264, such as a smartphone 252/262 or a computer 254/264. In some embodiments, a personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
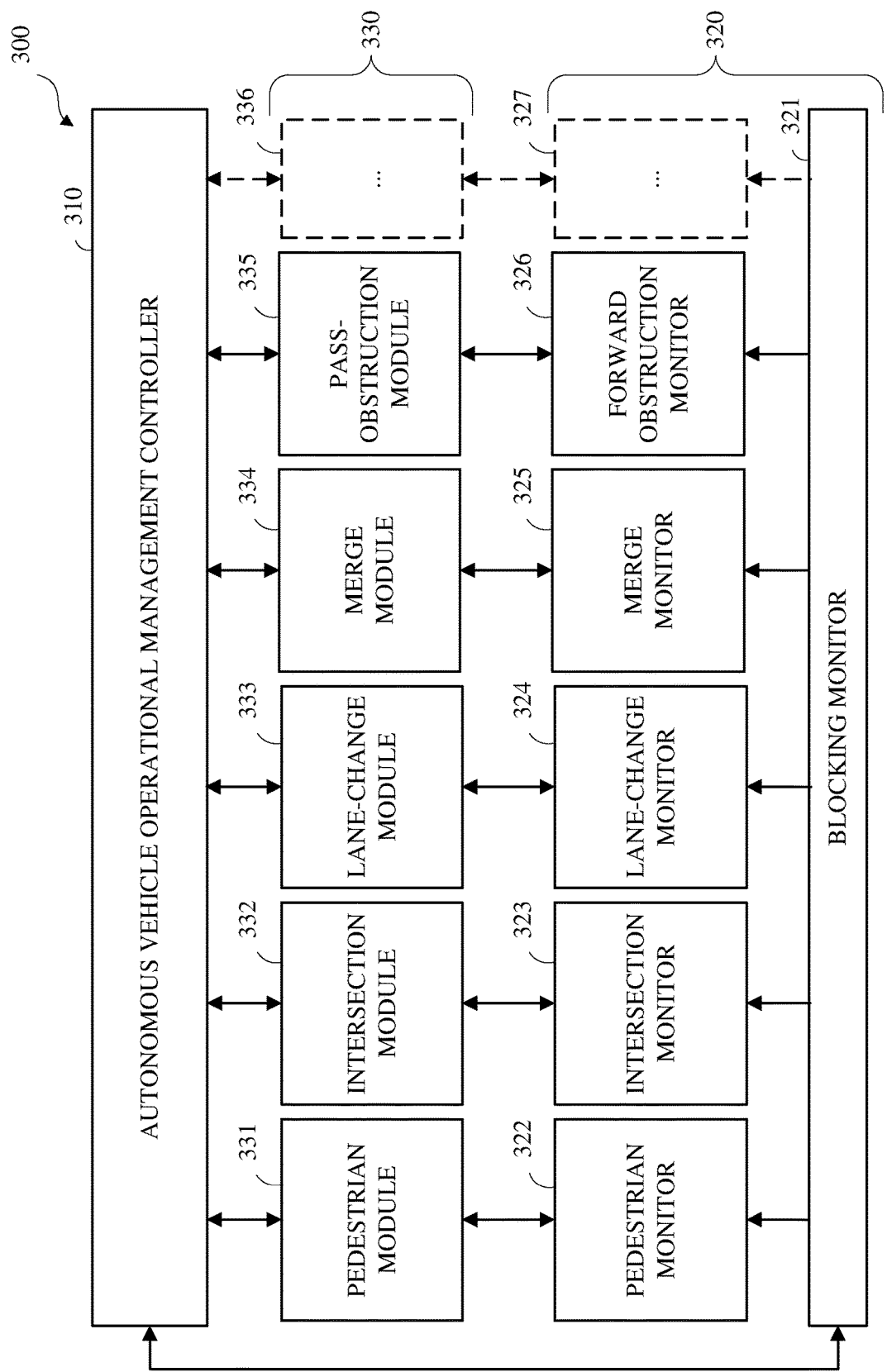
FIG. 3 is a diagram of an example of an autonomous vehicle operational management system in accordance with embodiments of this disclosure.

FIG. 3 is a diagram of an example of an autonomous vehicle operational management system 300 in accordance with embodiments of this disclosure. The autonomous vehicle operational management system 300 may be implemented in an autonomous vehicle, such as the vehicle 100 shown in FIG. 1, one of the vehicles 210/211 shown in FIG. 2, a semi-autonomous vehicle, or any other vehicle implementing autonomous driving.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

As shown in FIG. 3, the autonomous vehicle operational management system 300 includes an autonomous vehicle operational management controller 310 (AVOMC), operational environment monitors 320, and operation control evaluation models 330.

The AVOMC 310, or another unit of the autonomous vehicle, may control the autonomous vehicle to traverse the vehicle transportation network, or a portion thereof. Controlling the autonomous vehicle to traverse the vehicle transportation network may include monitoring the operational environment of the autonomous vehicle, identifying or detecting distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

The AVOMC 310 may receive, identify, or otherwise access, operational environment data representing an operational environment for the autonomous vehicle, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to the autonomous vehicle, an identified route for the autonomous vehicle, or both. For example, this may include information within a defined spatial distance, such as 300 meters, of portions of the vehicle transportation network along the identified route, information indicating the geometry of one or more aspects of the vehicle transportation network, information indicating a condition, such as a surface condition, of the vehicle transportation network, or any combination thereof. The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

The autonomous vehicle may traverse multiple distinct vehicle operational scenarios within an operational environment, which may be aspects of a compound vehicle operational scenario. The autonomous vehicle operational management system 300 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 310 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 310 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitor the operational environment of the autonomous vehicle may include using operational environment data received from the operational environment monitors 320.

The operational environment monitors 320 may include scenario-agnostic monitors, scenario-specific monitors, or a combination thereof. A scenario-agnostic monitor, such as a blocking monitor 321, may monitor the operational environment of the autonomous vehicle, generate operational environment data representing aspects of the operational environment of the autonomous vehicle, and output the operational environment data to one or more scenario-specific monitor, the AVOMC 310, or a combination thereof. A scenario-specific monitor, such as a pedestrian monitor 322, an intersection monitor 323, a lane-change monitor 324, a merge monitor 325, or a forward obstruction monitor 326, may monitor the operational environment of the autonomous vehicle, generate operational environment data representing scenario-specific aspects of the operational environment of the autonomous vehicle, and output the operational environment data to one or more scenario-specific operation control evaluation models 330, the AVOMC 310, or a combination thereof. For example, the pedestrian monitor 322 may be an operational environment monitor for monitoring pedestrians, the intersection monitor 323 may be an operational environment monitor for monitoring intersections, the lane-change monitor 324 may be an operational environment monitor for monitoring lane-changes, the merge monitor 325 may be an operational environment monitor for merges, and the forward obstruction monitor 326 may be an operational environment monitor for monitoring forward obstructions. An operational environment monitor 327 is shown using broken lines to indicate that the autonomous vehicle operational management system 300 may include any number of operational environment monitors 320.

An operational environment monitor 320 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 322 may receive, or otherwise access, information, such as sensor data, which may indicate, correspond to, or may otherwise be associated with, one or more pedestrians in the operational environment of the autonomous vehicle. An operational environment monitor 320 may associate the operational environment data, or a portion thereof, with the operational environment, or an aspect thereof, such as with an external object, such as a pedestrian, a remote vehicle, or an aspect of the vehicle transportation network geometry.

An operational environment monitor 320 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 320 may output the information representing the one or more aspects of the operational environment to, or for access by, the AVOMC 310, such by storing the information representing the one or more aspects of the operational environment in a memory, such as the memory 134 shown in FIG. 1, of the autonomous vehicle accessible by the AVOMC 310, sending the information representing the one or more aspects of the operational environment to the AVOMC 310, or a combination thereof. An operational environment monitor 320 may output the operational environment data to one or more elements of the autonomous vehicle operational management system 300, such as the AVOMC 310. Although not shown in FIG. 3, a scenario-specific operational environment monitor 322, 323, 324, 325, 326 may output operational environment data to a scenario-agnostic operational environment monitor, such as the blocking monitor 321.

The pedestrian monitor 322 may correlate, associate, or otherwise process the operational environment data to identify, track, or predict actions of one or more pedestrians. For example, the pedestrian monitor 322 may receive information, such as sensor data, from one or more sensors, which may correspond to one or more pedestrians, the pedestrian monitor 322 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 322 may output the identified, associated, or generated pedestrian information to, or for access by, the AVOMC 310.

The intersection monitor 323 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 323 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 323 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles. The intersection monitor 323 may output the identified, associated, or generated intersection information to, or for access by, the AVOMC 310.

The lane-change monitor 324 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 324 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 324 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles. The lane-change monitor 324 may output the identified, associated, or generated lane-change information to, or for access by, the AVOMC 310

The merge monitor 325 may correlate, associate, or otherwise process the operational environment information to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 325 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 325 may associate the sensor data with one or more identified remote vehicles in the operational environment of the autonomous vehicle, one or more aspects of the operational environment of the autonomous vehicle or a combination thereof geospatially corresponding to a merge operation, which may include identifying a current or expected direction of travel, a path, such as an expected path, a current or expected velocity, a current or expected acceleration rate, or a combination thereof for one or more of the respective identified remote vehicles. The merge monitor 325 may output the identified, associated, or generated merge information to, or for access by, the AVOMC 310.

The forward obstruction monitor 326 may correlate, associate, or otherwise process the operational environment information to identify one or more aspects of the operational environment of the autonomous vehicle geospatially corresponding to a forward pass-obstruction operation. For example, the forward obstruction monitor 326 may identify vehicle transportation network geometry in the operational environment of the autonomous vehicle. The forward obstruction monitor 326 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 326 may identify, track, or predict actions of one or more remote vehicles in the operational environment of the autonomous vehicle. The forward obstruction monitor 326 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation. The forward obstruction monitor 326 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles. The forward obstruction monitor 326 may output the identified, associated, or generated forward obstruction information to, or for access by, the AVOMC 310.

The blocking monitor 321 may receive operational environment data representing an operational environment, or an aspect thereof, for the autonomous vehicle. The blocking monitor 321 may determine a respective probability of availability, or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. The blocking monitor 321 may determine, or update, probabilities of availability continually or periodically. The blocking monitor 321 may communicate probabilities of availability, or corresponding blocking probabilities, to the AVOMC 310.

The AVOMC 310 may identify one or more distinct vehicle operational scenarios based on one or more aspects of the operational environment represented by the operational environment data. For example, the AVOMC 310 may identify a distinct vehicle operational scenario in response to identifying, or based on, the operational environment data indicated by one or more of the operational environment monitors 320. The distinct vehicle operational scenario may be identified based on route data, sensor data, or a combination thereof. For example, the AVOMC 310 may identify one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 310 may identify a pedestrian vehicle operational scenario, an intersection vehicle operational scenario, or both.

The AVOMC 310 may instantiate respective instances of one or more of the operation control evaluation models 330 based on one or more aspects of the operational environment represented by the operational environment data. The operation control evaluation models 330 may include scenario-specific operation control evaluation model (SSOCEMs), such as a pedestrian-SSOCEM 331, an intersection-SSOCEM 332, a lane-change-SSOCEM 333, a merge-SSOCEM 334, a pass-obstruction-SSOCEM 335, or a combination thereof. A SSOCEM 336 is shown using broken lines to indicate that the autonomous vehicle operational management system 300 may include any number of SSOCEMs 330. For example, the AVOMC 310 may instantiate an instance of a SSOCEM 330 in response to identifying a distinct vehicle operational scenario. The AVOMC 310 may instantiate multiple instances of one or more SSOCEMs 330 based on one or more aspects of the operational environment represented by the operational environment data. For example, the operational environment data may indicate two pedestrians in the operational environment of the autonomous vehicle and the AVOMC 310 may instantiate a respective instance of the pedestrian-SSOCEM 331 for each pedestrian based on one or more aspects of the operational environment represented by the operational environment data.

The AVOMC 310 may send the operational environment data, or one or more aspects thereof, to another unit of the autonomous vehicle, such as the blocking monitor 321 or one or more instances of the SSOCEMs 330. For example, the AVOMC 310 may communicate the probabilities of availability, or corresponding blocking probabilities, received from the blocking monitor 321 to respective instantiated instances of the SSOCEMs 330. The AVOMC 310 may store the operational environment data, or one or more aspects thereof, such as in a memory, such as the memory 134 shown in FIG. 1, of the autonomous vehicle.

Controlling the autonomous vehicle to traverse the vehicle transportation network may include identifying candidate vehicle control actions based on the distinct vehicle operational scenarios, controlling the autonomous vehicle to traverse a portion of the vehicle transportation network in accordance with one or more of the candidate vehicle control actions, or a combination thereof. For example, the AVOMC 310 may receive one or more candidate vehicle control actions from respective instances of the SSOCEMs 330. The AVOMC 310 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network. For example, an 'advance' vehicle control action may include slowly inching forward a short distance, such as a few inches or a foot; an 'accelerate' vehicle control action may include accelerating a defined acceleration rate, or at an acceleration rate within a defined range; a 'decelerate' vehicle control action may include decelerating a defined deceleration rate, or at a deceleration rate within a defined range; a 'maintain' vehicle control action may include maintaining current operational parameters, such as by maintaining a current velocity, a current path or route, or a current lane orientation; and a 'proceed' vehicle control action may include beginning or resuming a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained. A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The AVOMC 310 may uninstantiate an instance of a SSOCEM 330. For example, the AVOMC 310 may identify a distinct set of operative conditions as indicating a distinct vehicle operational scenario for the autonomous vehicle, instantiate an instance of a SSOCEM 330 for the distinct vehicle operational scenario, monitor the operative conditions, subsequently determine that one or more of the operative conditions has expired, or has a probability of affecting the operation of the autonomous vehicle below a defined threshold, and the AVOMC 310 may uninstantiate the instance of the SSOCEM 330.

The AVOMC 310 may instantiate and uninstantiate instances of SSOCEMs 330 based on one or more vehicle operational management control metrics, such as an immanency metric, an urgency metric, a utility metric, an acceptability metric, or a combination thereof. An immanency metric may indicate, represent, or be based on, a spatial, temporal, or spatiotemporal distance or proximity, which may be an expected distance or proximity, for the vehicle to traverse the vehicle transportation network from a current location of the vehicle to a portion of the vehicle transportation network corresponding to a respective identified vehicle operational scenario. An urgency metric may indicate, represent, or be based on, a measure of the spatial, temporal, or spatiotemporal distance available for controlling the vehicle to traverse a portion of the vehicle transportation network corresponding to a respective identified vehicle operational scenario. A utility metric may indicate, represent, or be based on, an expected value of instantiating an instance of a SSOCEM 330 corresponding to a respective identified vehicle operational scenario. An acceptability metric may be a safety metric, such a metric indicating collision avoidance, a vehicle transportation network control compliance metric, such as a metric indicating compliance with vehicle transportation network rules and regulations, a physical capability metric, such as a metric indicating a maximum braking capability of the vehicle, a user defined metric, such as a user preference. Other metrics, or combinations of metrics may be used. A vehicle operational management control metric may indicate a defined rate, range, or limit. For example, an acceptability metric may indicate a defined target rate of deceleration, a defined range of deceleration rates, or a defined maximum rate of deceleration.

A SSOCEM 330 may include one or more models of a respective distinct vehicle operational scenario. The autonomous vehicle operational management system 300 may include any number of SSOCEMs 330, each including models of a respective distinct vehicle operational scenario. A SSOCEM 330 may include one or more models from one or more types of models. For example, a SSOCEM 330 may include a Partially Observable Markov Decision Process (POMDP) model, a Markov Decision Process (MDP) model, a Classical Planning model, a Partially Observable Stochastic Game (POSG) model, a Decentralized Partially Observable Markov Decision Process (Dec-POMDP) model, a Reinforcement Learning (RL) model, an artificial neural network model, or any other model of a respective distinct vehicle operational scenario. Each different type of model may have respective characteristics for accuracy and resource utilization. For example, a POMDP model for a defined scenario may have greater accuracy and greater resource utilization than an MDP model for the defined scenario. The models included in a SSOCEM 330 may be ordered, such as hierarchically, such as based on accuracy. For example, a designated model, such as the most accurate model included in an SSOCEM 330, may be identified as the primary model for the SSOCEM 330 and other models included in the SSOCEM 330 may be identified as secondary models.

In an example, one or more of the SSOCEMs 330 may include a POMDP model, which may be a single-agent model. A POMDP model may model a distinct vehicle operational scenario, which may include modeling uncertainty, using a set of states (S), a set of actions (A), a set of observations ($\Omega$), a set of state transition probabilities (T), a set of conditional observation probabilities (O), a reward function (R), or a combination thereof. A POMDP model may be defined or described as a tuple <S, A, $\Omega$, T, O, R>.

A state from the set of states (S), may represent a distinct condition of respective defined aspects, such as external objects and traffic control devices, of the operational environment of the autonomous vehicle that may probabilistically affect the operation of the autonomous vehicle at a discrete temporal location. A respective set of states (S) may be defined for each distinct vehicle operational scenario. Each state (state space), from a set of states (S) may include one or more defined state factors. Although some examples of state factors for some models are described herein, a model, including any model described herein, may include any number, or cardinality, of state factors. Each state factor may represent a defined aspect of the respective scenario, and may have a respective defined set of values. Although some examples of state factor values for some state factors are described herein, a state factor, including any state factor described herein, may include any number, or cardinality, of values.

An action from the set of actions (A) may indicate an available vehicle control action at each state in the set of states (S). A respective set of actions may be defined for each distinct vehicle operational scenario. Each action (action space), from a set of actions (A) may include one or more defined action factors. Although some examples of action factors for some models are described herein, a model, including any model described herein, may include any number, or cardinality, of action factors. Each action factor may represent an available vehicle control action, and may have a respective defined set of values. Although some examples of action factor values for some action factors are described herein, an action factor, including any action factor described herein, may include any number, or cardinality, of values.

An observation from the set of observations ($\Omega$) may indicate available observable, measurable, or determinable data for each state from the set of states (S). A respective set of observations may be defined for each distinct vehicle operational scenario. Each observation (observation space), from a set of observations ($\Omega$) may include one or more defined observation factors. Although some examples of observation factors for some models are described herein, a model, including any model described herein, may include any number, or cardinality, of observation factors. Each observations factor may represent available observations, and may have a respective defined set of values. Although some examples of observation factor values for some observation factors are described herein, an observation factor, including any observation factor described herein, may include any number, or cardinality, of values.

A state transition probability from the set of state transition probabilities (T) may probabilistically represent changes to the operational environment of the autonomous vehicle, as represented by the set of states (S), responsive to the actions of the autonomous vehicle, as represented by the set of actions (A), which may be expressed as T: S×A×S→[0, 1]. A respective set of state transition probabilities (T) may be defined for each distinct vehicle operational scenario. Although some examples of state transition probabilities for some models are described herein, a model, including any model described herein, may include any number, or cardinality, of state transition probabilities. For example, each combination of a state, an action, and a subsequent state may be associated with a respective state transition probability.

A conditional observation probability from the set of conditional observation probabilities (O) may represent probabilities of making respective observations ($\Omega$) based on the operational environment of the autonomous vehicle, as represented by the set of states (S), responsive to the actions of the autonomous vehicle, as represented by the set of actions (A), which may be represented as O: A×S×$\Omega$→[0, 1]. A respective set of conditional observation probabilities (O) may be defined for each distinct vehicle operational scenario. Although some examples of state conditional observation probabilities for some models are described herein, a model, including any model described herein, may include any number, or cardinality, of conditional observation probabilities. For example, each combination of an action, a subsequent state, and an observation may be associated with a respective conditional observation probability.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: S×A→R.

For simplicity and clarity, the examples of values of a model, such as state factor values or observation factor values, described herein include categorical representations, such as {start, goal} or {short, long}. The categorical values may represent defined discrete values, which may be relative values. For example, a state factor representing a temporal aspect may have values from the set {short, long}; the value 'short' may represent discrete values, such as a temporal distance, within, or less than, a defined threshold, such as three seconds, and the value 'long' may represent discrete values, such as a temporal distance, of at least, such as equal to or greater than, the defined threshold. Defined thresholds for respective categorical values may be defined relative to associated factors. For example, a defined threshold for the set {short, long} for a temporal factor may be associated with a relative spatial location factor value and another defined threshold for the set {short, long} for the temporal factor may be associated with another relative spatial location factor value. Although categorical representations of factor values are described herein, other representations, or combinations of representations, may be used. For example, a set of temporal state factor values may be {short (representing values of less than three seconds), 4, 5, 6, long (representing values of at least 7 seconds)}.

In some embodiments, such as embodiments implementing a POMDP model, modeling an autonomous vehicle operational control scenario may include modeling occlusions. For example, the operational environment data may include information corresponding to one or more occlusions, such as sensor occlusions, in the operational environment of the autonomous vehicle such that the operational environment data may omit information representing one or more occluded external objects in the operational environment of the autonomous vehicle. For example, an occlusion may be an external object, such as a traffic signs, a building, a tree, an identified external object, or any other operational condition or combination of operational conditions capable of occluding one or more other operational conditions, such as external objects, from the autonomous vehicle at a defined spatiotemporal location. In some embodiments, an operational environment monitor 320 may identify occlusions, may identify or determine a probability that an external object is occluded, or hidden, by an identified occlusion, and may include occluded vehicle probability information in the operational environment data output to the AVOMC 310, and communicated, by the AVOMC 310, to the respective SSOCEMs 330.

The autonomous vehicle operational management system 300 may include any number or combination of types of models. For example, the pedestrian-SSOCEM 331, the intersection-SSOCEM 332, the lane-change-SSOCEM 333, the merge-SSOCEM 334, and the pass-obstruction-SSOCEM 335 may be POMDP models. In another example, the pedestrian-SSOCEM 331 may be a MDP model and the intersection-SSOCEM 332 may be a POMDP model. The AVOMC 310 may instantiate any number of instances of the SSOCEMs 330 based on the operational environment data.

Instantiating a SSOCEM 330 instance may include identifying a model from the SSOCEM 330, and instantiating an instance of the identified model. For example, a SSOCEM 330 may include a primary model and a secondary model for a respective distinct vehicle operational scenario, and instantiating the SSOCEM 330 may include identifying the primary model as a current model and instantiating an instance of the primary model. Instantiating a model may include determining whether a solution or policy is available for the model. Instantiating a model may include determining whether an available solution or policy for the model is partially solved, or is convergent and solved. Instantiating a SSOCEM 330 may include instantiating an instance of a solution or policy for the identified model for the SSOCEM 330.

Solving a model, such as a POMDP model, may include determining a policy or solution, which may be a function, that maximizes an accrued reward, which may be determined by evaluating the possible combinations of the elements of the tuple, such as <S, A, Ω, T, O, R>, that defines the model. A policy or solution may identify or output a reward maximized, or optimal, candidate vehicle control action based on identified belief state data. The identified belief state data, which may be probabilistic, may indicate current state data, such as a current set of state values for the respective model, or a probability for the current set of state values, and may correspond with a respective relative temporal location. For example, solving a MDP model may include identifying a state from the set of states (S), identifying an action from the set of action (A), determining a subsequent, or successor, state from the set of states (S) subsequent to simulating the action subject to the state transition probabilities. Each state may be associated with a corresponding utility value, and solving the MDP model may include determining respective utility values corresponding to each possible combination of state, action, and subsequent state. The utility value of the subsequent state may be identified as the maximum identified utility value subject to a reward, or penalty, which may be a discounted reward, or penalty. The policy may indicate an action corresponding to the maximum utility value for a respective state. Solving a POMDP model may be similar to solving the MDP model, except based on belief states, representing probabilities for respective states and subject to observation probabilities corresponding generating observations for respective states. Thus, solving the SSOCEM model includes evaluating the possible state-action-state transitions and updating respective belief states, such as using Bayes rule, based on respective actions and observations.

In some implementations, a model, such as a MDP model or a POMDP model, may reduce the resource utilization associated with solving the corresponding model by evaluating the states, belief states, or both, modeled therein to identify computations corresponding to the respective states, belief states, or both that may be omitted and omitting performing the identified computations, which may include obtaining or maintaining a measure of current quality, such as upper and lower bounds on utility for the respective state, belief state, or both. In some implementations, solving a model may include parallel processing, such as parallel processing using multiple processor cores or using multiple processors, which may include graphics processing units (GPUs). In some implementations, solving a model may include obtaining an approximation of the model, which may improve the efficiency of solving the model.

Figure 4:
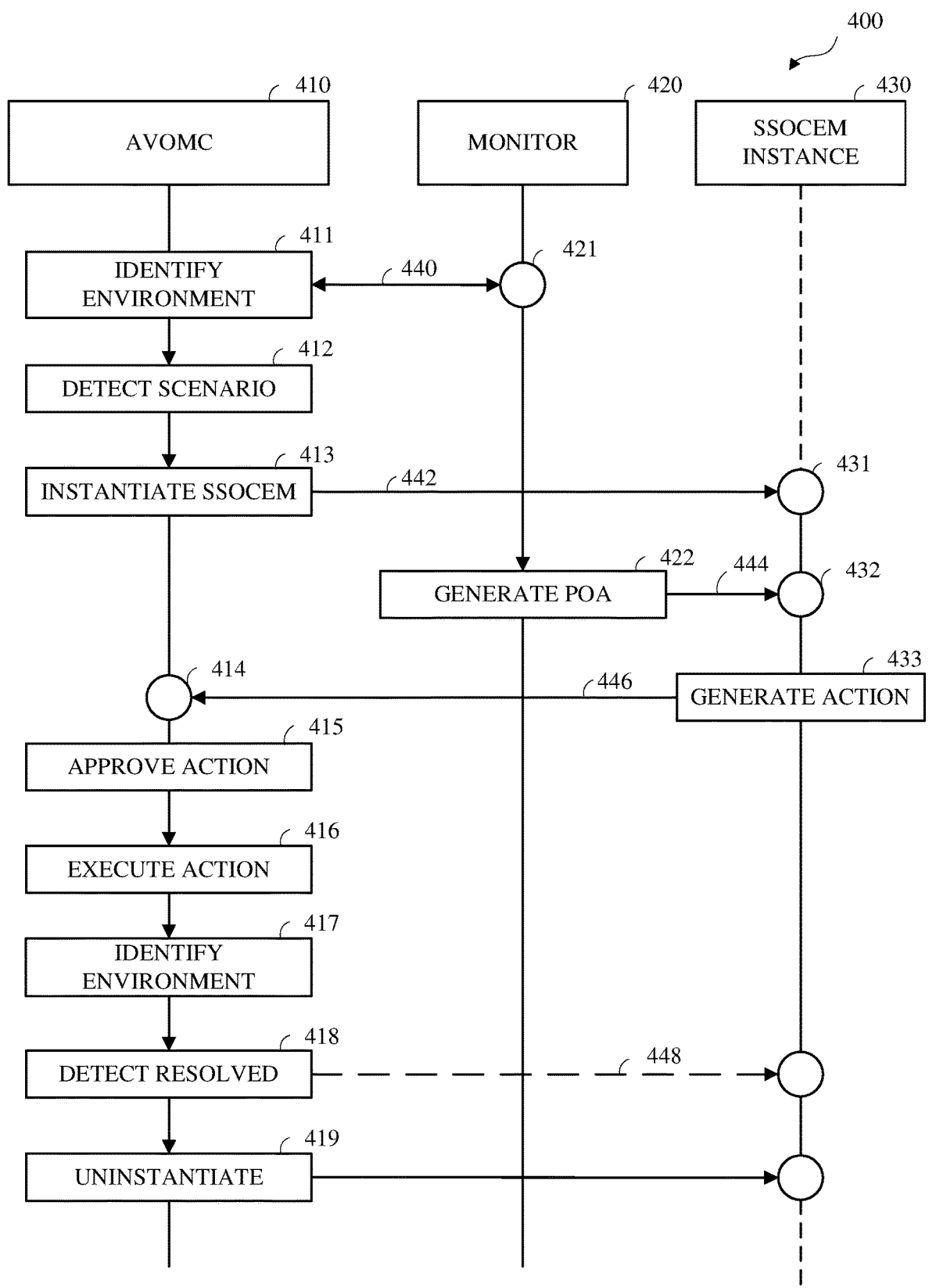
FIG. 4 is a flow diagram of an example of an autonomous vehicle operational management in accordance with embodiments of this disclosure.

FIG. 4 is a flow diagram of an example of autonomous vehicle operational management 400 in accordance with embodiments of this disclosure. Autonomous vehicle operational management 400 may be implemented in an autonomous vehicle, such as the vehicle 100 shown in FIG. 1, one of the vehicles 210/211 shown in FIG. 2, a semi-autonomous vehicle, or any other vehicle implementing autonomous driving. For example, an autonomous vehicle may implement an autonomous vehicle operational management system, such as the autonomous vehicle operational management system 300 shown in FIG. 3.

As shown in FIG. 4, autonomous vehicle operational management 400 includes implementing or operating the autonomous vehicle operational management system, including one or more models, devices, or components thereof, which may include operating an autonomous vehicle operational management controller (AVOMC) 410, such as the AVOMC 310 shown in FIG. 3; operating operational environment monitors 420, such as one or more of the operational environment monitors 330 shown in FIG. 3; and operating a scenario-specific operational control evaluation model instance (SSOCEM instance) 430, such as an instance of a SSOCEM 330 shown in FIG. 3.

The AVOMC 410 may monitor the operational environment of the autonomous vehicle, or defined aspects thereof, at 411 to identify an operational environment, or an aspect thereof, of the autonomous vehicle. For example, operational environment monitors 420 may monitor scenario-specific aspects of the operational environment and may send operational environment data representing the operational environment to the AVOMC 410. Monitoring the operational environment of the autonomous vehicle may include identifying and tracking external objects at 411, identifying distinct vehicle operational scenarios at 412, or a combination thereof. For example, the AVOMC 410, the operational environment monitors 420, or both, may identify the operational environment data based on sensor data, vehicle data, route data, vehicle transportation network data, previously identified operational environment data, or any other available data, or combination of data, describing an aspect or aspects of the operational environment.

Identifying the operational environment may include identifying operational environment data representing the operational environment, or one or more aspects thereof. The operational environment data may include vehicle information for the autonomous vehicle, information representing the vehicle transportation network, or one or more aspects thereof, proximate to the autonomous vehicle, information representing external objects, or one or more aspects thereof, within the operational environment of the autonomous vehicle, along or proximate to a route identified for the autonomous vehicle, or a combination thereof. The sensor information may be processed sensor information, such as processed sensor information from a sensor information processing unit of the autonomous vehicle, which may receive sensor information from the sensor of the autonomous vehicle and may generate the processed sensor information based on the sensor information.

Identifying the operational environment data may include receiving information indicating one or more aspects of the operational environment from a sensor of the autonomous vehicle, such as the sensor 136 shown in FIG. 1 or the on-vehicle sensors described in FIG. 2. The sensor, or another unit of the autonomous vehicle, may store the sensor information in a memory, such as the memory 134 shown in FIG. 1, of the autonomous vehicle, and the AVOMC 410 may read the sensor information from the memory.

Identifying the operational environment data may include identifying information indicating one or more aspects of the operational environment from vehicle transportation network data. For example, the AVOMC 410 may read, or otherwise receive, vehicle transportation network data indicating that the autonomous vehicle is approaching an intersection, or otherwise describing a geometry or configuration of the vehicle transportation network proximate to the autonomous vehicle, such as within a maximum of 300 meters of the autonomous vehicle.

Identifying the operational environment data at 411 may include identifying information indicating one or more aspects of the operational environment from a remote vehicle or other remote device external to the autonomous vehicle. For example, the autonomous vehicle may receive, from a remote vehicle, via a wireless electronic communication link, a remote vehicle message including remote vehicle information indicating remote vehicle geospatial state information for the remote vehicle, remote vehicle kinematic state information for the remote vehicle, or both.

Identifying the operational environment data may include identifying information indicating one or more aspects of the operational environment from route data representing an identified route for the autonomous vehicle. For example, the AVOMC 410 may read, or otherwise receive, vehicle transportation network data representing an identified route, such as a route identified in response to user input, for the autonomous vehicle.

The AVOMC 410 and the operational environment monitors 420 may communicate to identify the operational environment information as indicated at 411, 440, and 421. Alternatively, or in addition, the operational environment monitors 420 may receive the operational environment data from another component of the autonomous vehicle, such as from a sensor of the autonomous vehicle or from another operational environment monitor 420, or the operational environment monitors 420 may read the operational environment data from a memory of the autonomous vehicle.

The AVOMC 410 may detect or identify one or more distinct vehicle operational scenarios at 412, such as based on one or more aspects of the operational environment represented by the operational environment data identified at 411.

The AVOMC 410 may instantiate a SSOCEM instance 430 based on one or more aspects of the operational environment represented by the operational environment data at 413, such as in response to identifying a distinct vehicle operational scenario at 412. Although one SSOCEM instance 430 is shown in FIG. 4, the AVOMC 410 may instantiate multiple SSOCEM instances 430 based on one or more aspects of the operational environment represented by the operational environment data identified at 411, each SSOCEM instance 430 corresponding to a respective distinct vehicle operational scenario detected at 412, or a combination of a distinct external object identified at 411 and a respective distinct vehicle operational scenario detected at 412. Instantiating a SSOCEM instance 430 at 413 may include sending the operational environment data representing an operational environment for the autonomous vehicle to the SSOCEM instance 430 as indicated at 442. The SSOCEM instance 430 may receive the operational environment data representing an operational environment for the autonomous vehicle, or one or more aspects thereof, at 431. Instantiating a SS OCEM instance 430 at 413 may include identifying a model, such as a primary model or a secondary model, of the distinct vehicle operational scenario, instantiating an instance of the model, identifying a solution or policy corresponding to the model, instantiating an instance of the solution or policy, or a combination thereof.

The operational environment monitors 420 may include a blocking monitor, such as the blocking monitor 321 shown in FIG. 3, which may determine a respective probability of availability (POA), or corresponding blocking probability, at 422 for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. The blocking monitor may send the probabilities of availability identified at 422 to the SSOCEM instance 430 at 444. Alternatively, or in addition, the blocking monitor may store the probabilities of availability identified at 422 in a memory of the autonomous vehicle. Although not expressly shown in FIG. 4, the blocking monitor may send the probabilities of availability identified at 422 to the AVOMC 410 at 444 in addition to, or in alternative to, sending the probabilities of availability to the SSOCEM instance 430. The SSOCEM instance 430 may receive the probabilities of availability at 432.

The SSOCEM instance 430 may generate or identify a candidate vehicle control action at 433. For example, the SSOCEM instance 430 may generate or identify the candidate vehicle control action at 433 in response to receiving the operational environment data 431, receiving the probability of availability data at 432, or both. For example, the instance of the solution or policy instantiated at 431 for the model of the distinct vehicle operational scenario may output the candidate vehicle control action based on the operational environment data, the probability of availability data, or both. The SSOCEM instance 430 may send the candidate vehicle control action identified at 433 to the AVOMC 410 at 446. Alternatively, or in addition, the SSOCEM instance 430 may store the candidate vehicle control action identified at 433 in a memory of the autonomous vehicle.

The AVOMC 410 may receive a candidate vehicle control action at 414. For example, the AVOMC 410 may receive the candidate vehicle control action from the SSOCEM instance 430 at 414. Alternatively, or in addition, the AVOMC 410 may read the candidate vehicle control action from a memory of the autonomous vehicle.

The AVOMC 410 may approve the candidate vehicle control action, or otherwise identify the candidate vehicle control action as a vehicle control action for controlling the autonomous vehicle to traverse the vehicle transportation network, at 415. Approving a candidate vehicle control action at 415 may include determining whether to traverse a portion of the vehicle transportation network in accordance with the candidate vehicle control action.

The AVOMC 410 may control, or may provide the identified vehicle control action to another vehicle control unit to control, the autonomous vehicle to traverse the vehicle transportation network, or a portion thereof, at 416 in accordance with the vehicle control action identified at 415.

The AVOMC 410 may identify an operational environment, or an aspect thereof, of the autonomous vehicle at 417. Identifying an operational environment, or an aspect thereof, of the autonomous vehicle at 417 may be similar to identifying the operational environment of the autonomous vehicle at 411 and may include updating previously identified operational environment data.

The AVOMC 410 may determine or detect whether a distinct vehicle operational scenario is resolved or unresolved at 418. For example, the AVOMC 410 may receive operation environment information continuously or on a periodic basis, as described above. The AVOMC 410 may evaluate the operational environment data to determine whether the distinct vehicle operational scenario has resolved.

The AVOMC 410 may determine that the distinct vehicle operational scenario corresponding to the SSOCEM instance 430 is unresolved at 418, the AVOMC 410 may send the operational environment data identified at 417 to the SSOCEM instances 430 as indicated at 448, and uninstantiating the SSOCEM instance 430 at 418 may be omitted or modified.

The AVOMC 410 may determine that the distinct vehicle operational scenario is resolved at 418 and may uninstantiate at 419 the SSOCEM instances 430 corresponding to the distinct vehicle operational scenario determined to be resolved at 418. For example, the AVOMC 410 may identify a distinct set of operative conditions forming the distinct vehicle operational scenario for the autonomous vehicle at 412, may determine that one or more of the operative conditions has expired, or has a probability of affecting the operation of the autonomous vehicle below a defined threshold at 418, and may uninstantiate the corresponding SS OCEM instance 430.

Although not expressly shown in FIG. 4, the AVOMC 410 may continually, such as periodically, repeat identifying or updating the operational environment data at 417, determining whether the distinct vehicle operational scenario is resolved at 418, and, in response to determining that the distinct vehicle operational scenario is unresolved at 418, sending the operational environment data identified at 417 to the SSOCEM instances 430 as indicated at 448, until determining whether the distinct vehicle operational scenario is resolved at 418 includes determining that the distinct vehicle operational scenario is resolved.

Figure 5:
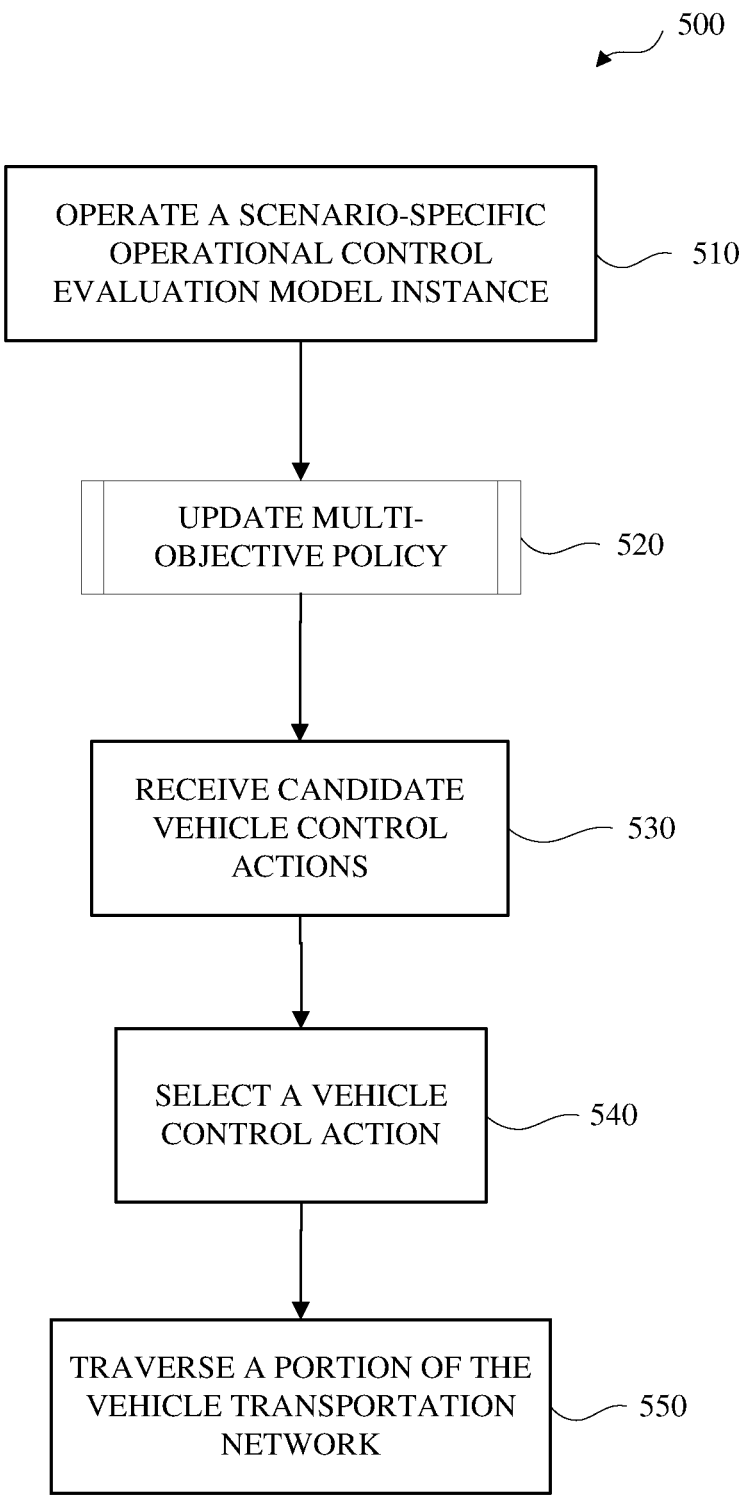
FIG. 5 is a flow diagram of an example method for traversing a vehicle transportation network in accordance with embodiments of this disclosure.

FIG. 5 is a flow diagram of an example method 500 for traversing a vehicle transportation network in accordance with embodiments of this disclosure. The method 500 may be implemented in an autonomous vehicle, such as the vehicle 100 shown in FIG. 1, one of the vehicles 210/211 shown in FIG. 2, a semi-autonomous vehicle, or any other vehicle implementing autonomous driving. For example, an autonomous vehicle may implement the method 500 using an autonomous vehicle operational management system, such as the autonomous vehicle operational management system 300 shown in FIG. 3. In some implementations described herein, the method 500 may be implemented in a remote assistance or support center, such as by a control center incorporating the communication device 240.

As shown in FIG. 5, the method 500 includes operating 510 an instance of a scenario-specific operational control evaluation model. The scenario-specific control evaluation model may model a distinct vehicle operational scenario. Operating 510 the instance may depend upon a multi-objective policy for the SSOCEM. The multi-objective policy may include at least two objectives (e.g., at least a first objective and a second objective), and may include a priority of the first objective relative to the second objective.

That is, each SSOCEM may be defined with multiple objectives. The objectives can include risk, aggressiveness, behavior preferences, comfort, social acceptability, time and/or speed to complete the selected vehicle control action, or any combination thereof. In some examples, social acceptability may be based on social niceties that differ by country, region, or town.

The multi-objective policy may be based on topological MDPs (TMDPs) and topological POMDPs (TPOMDPs). For example, the multi-objective policy may include data for separate objectives for the same problem. In some examples, the data may include one or more topological graphs. The topological graphs may be used to show the relationship between the objectives (e.g., the priority of each objective as compared to others). The edges in the graphs may define a constraint relationship restricting the policies of different objectives. The graph may arrange the objectives from the most important objective to the least important objective as described in additional detail below.

The multi-objective policy may be a default policy, or may be the last stored policy associated with the SSOCEM instance. Accordingly, the method 500 may include updating 520 the multi-objective policy. Details of updating 520 the multi-objective policy are described in additional detail below beginning at FIG. 10.

The method 500 includes receiving 530 candidate vehicle control actions. The vehicle control actions may be generated in view of the multi-objective policy for the scenario-specific operational control evaluation model instance. The received candidate vehicle controls action may be associated with each of the two objectives. In some examples, the vehicle control actions may be refined to narrow the available vehicle control actions for selection.

The method 500 includes selecting 540 a vehicle control action. The selected vehicle control action may be based on the multi-objective policy. In particular, the selected vehicle control action may be based on the relationship(s) between the objectives of the multi-objective policy, such as the priority of the first objective relative to the second objective. Selecting 540 a vehicle control action may include selecting 540 more than one control action to be performed substantially simultaneously. Selecting 540 a vehicle control action may include selecting 540 a sequence of control actions for a defined period of time.

Examples of receiving 530 candidate vehicle control actions and selecting 540 a vehicle control action are described below beginning with FIG. 6. In a simple example, one objective may be based on maximizing a behavior preference and another objective may be based on minimizing a time to complete a vehicle control action (e.g., to resolve the instance). If a behavior preference is indicated as a priority over time, a candidate vehicle control action associated with the behavior preference may be selected that potentially increases the amount of time to resolve the instance, such as to turn a corner, pass another vehicle, reach the other side of an intersection, etc.

The method 500 includes traversing 550 a portion of the vehicle transportation network in accordance with the selected vehicle control action. Certain possible vehicle control actions are described above with regards to the AVOMC 310. In the following examples, vehicle control actions for an intersection may include stop, edge, or go (proceed). A stop vehicle control action may cause the vehicle to remain stationary or decelerate to a stationary position. An edge vehicle control action may cause the vehicle to incrementally approach the intersection to obtain a better view of the intersection. A go or proceed vehicle control action (i.e., when the vehicle is stationary) may cause the vehicle to accelerate and traverse the intersection.

FIGS. 6-9 describe examples of receiving 530 candidate vehicle control actions and selecting 540 a vehicle control action in consideration of the multi-objective policy.

Figure 6:
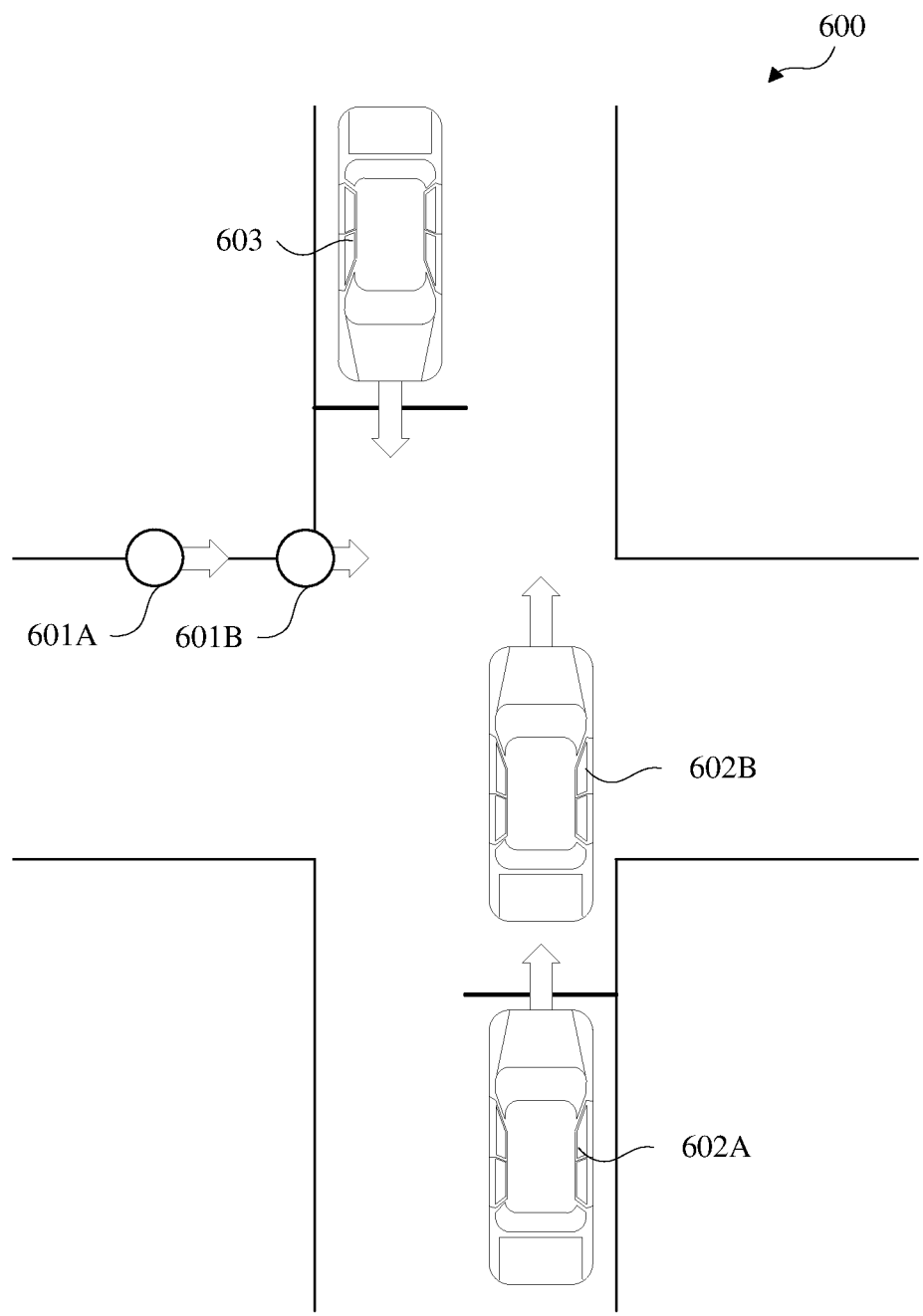
FIG. 6 is a diagram of an example of an intersection scene where an autonomous vehicle action is determined using a first multi-objective policy.

FIG. 6 is a diagram of an example of an intersection scene 600 where an autonomous vehicle action is based on aggressiveness (or risk) and time. In this example, at t=0, a pedestrian is approaching the intersection at position 601A. The autonomous vehicle and another vehicle are stationary at their respective stop lines, at respective positions 602A and 603. The autonomous vehicle may operate an instance of a scenario-specific operational control evaluation model that predicts the behavior of the other vehicle and the pedestrian in the future up to a defined future time so as to select vehicle control actions for the autonomous vehicle. Given a single objective, such as maximizing the probability of reaching the other side of the intersection without incident (e.g., minimizing time), the instance may conclude that the pedestrian is moving too slowly to interfere with reaching the other side of the intersection, and that the vehicle will remain at position 603. Accordingly, the autonomous vehicle enters the intersection at position 602B, and the pedestrian enters the intersection at position 601B. The vehicle remains stationary at position 603 at time t=1. In such an example, a human would generally brake, or not advance while waiting to further assess the actions of the pedestrian.

Incorporating a multi-objective policy may modify the vehicle control action of the autonomous vehicle in the example of FIG. 6. For example, while the first objective remains to minimize the expected time to reach the other side of the intersection, the second objective can be to minimize aggressiveness (and hence minimizing the risk that the pedestrian and the autonomous vehicle have interfering paths in the intersection). The priority of the first objective relative to the second objective can indicate a preference for the first objective over the second objective. A buffer value can indicate a constraint that relates the first objective and the second objective. For example, the buffer value can indicate a constraint applied to the preference within the scenario-specific operational control evaluation model.

More specifically, a buffer value can indicate how many units, of a defined measurement unit, that the scenario-specific operational control evaluation model will allow deviation from one objective in favor of another objective. The buffer value may be a user-defined allowable likelihood of reaching any risky situation. The buffer value may be a tolerance value associated with an allowable amount of variation of risk between objectives. The defined measurement units may be a probability value (e.g., between 0 and 1). The defined measurement units may be time (e.g., in seconds). Other units may be used.

Considering this example in FIG. 6 of the first objective of minimizing the expected time to reach the other side of the intersection and the second objective of minimizing aggressiveness (or risk), the minimum time of the second objective may be fixed. The buffer value may represent the allowable likelihood of reaching a risky situation. In this example, the buffer value δ may represent the probability that the pedestrian and the autonomous vehicle will have interfering paths while attempting to satisfy the first objective (passing through the intersection at the minimum time).

At belief state b, the available actions may include stop, edge, and go. In an example, the buffer value may be δ=0.1, which reflects a low probability that the situation that the second objective is trying to avoid will occur. Based on the buffer value, the vehicle control actions available for the second objective may be stop and edge while further assessing the behavior of the pedestrian vis-a-vis the intersection. Based on the buffer value, the autonomous vehicle selects the edge action for the first objective from the available actions to traverse the intersection, so that the autonomous vehicle does not reach the position 602B at t=1, and instead only advances slightly, if at all, from the position 602A. In another example, if the buffer value is δ=0, the first objective is constrained so that the probability of intersecting paths for the pedestrian and the autonomous vehicle is 0. The available actions may be limited to stop at t=1, such that the autonomous vehicle remains at the position 602A.

Figure 7B:
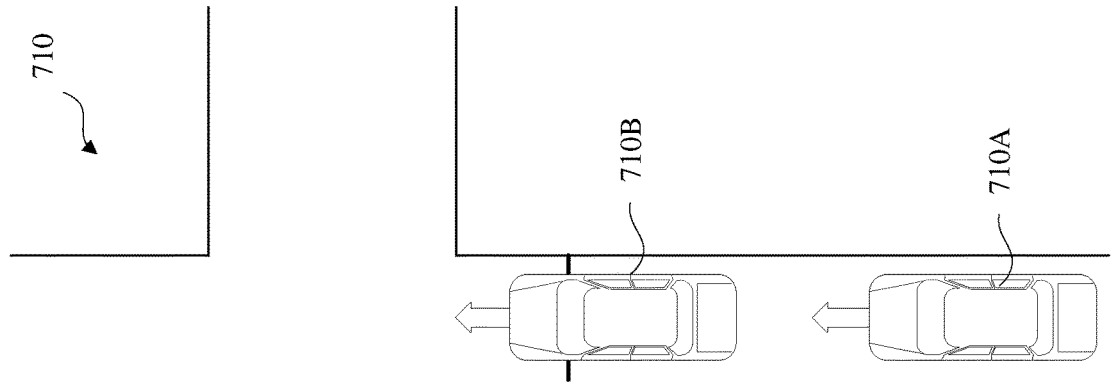
FIGS. 7A and 7B are diagrams of example intersection scenes where an autonomous vehicle action is determined using a second multi-objective policy.
Figure 7A:
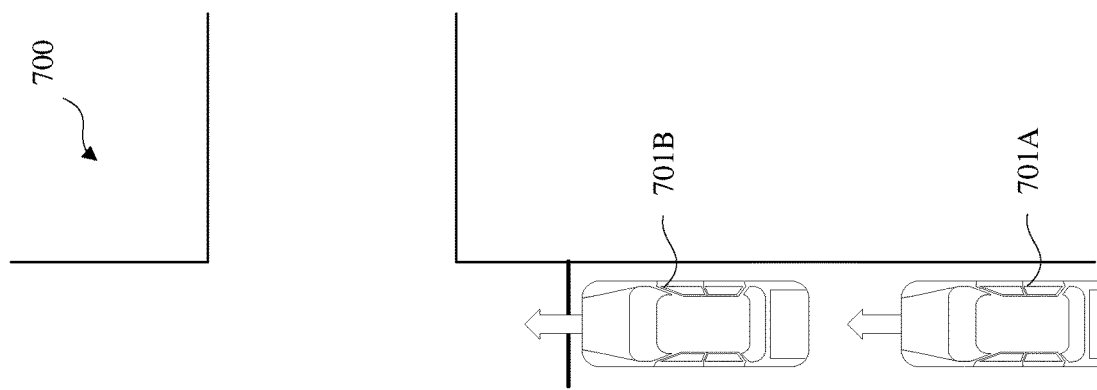

FIGS. 7A and 7B are diagrams of example intersection scenes 700, 710 where an autonomous vehicle action is based on a behavior preference, in this example comfort or social acceptability, or both, and time.

In FIG. 7A, at t=0, an autonomous vehicle is at position 701A approaching a stop line (e.g., associated with a stop sign) at an intersection. The autonomous vehicle may operate an instance of a scenario-specific operational control evaluation model that selects vehicle control actions of stopping the autonomous vehicle, and then proceeding through the intersection. Given a single objective, such as maximizing the probability of reaching the other side of the intersection without incident (e.g., minimizing time), the instance may conclude that the sequence of control actions is to stop (at t=1) at the stop line at position 701B, edge forward from the position 701B and stop again past the stop line to expand the ability of the sensors to capture possible interfering objects (and assess their actions relative to the autonomous vehicle reaching the other side of the intersection without incident), and then go when the autonomous vehicle confirms it is safe. In such an example, however, a human would likely increase their comfort in favor of one stop over the two stops by stopping slightly over the stop line to obtain a better view, and advancing when it is clear.

Incorporating a multi-objective policy may modify the vehicle control action of the autonomous vehicle in the example of FIG. 7A. For example, a first objective for the autonomous vehicle may be to minimize the expected time to reach the other side of the intersection, and the second objective may be to maximize the behavior preference, here comfort (by minimizing the probability of including two stops in favor of one). The priority of the first objective relative to the second objective can indicate a level of preference to apply to the first objective (or conversely the second objective) in determining the vehicle control actions.

Considering this example in FIG. 7B of the second objective of maximizing comfort and the first objective of minimizing the expected time to reach the other side of the intersection, the buffer value $\delta$ may be an allowable decrease in the probability of vehicle control actions resulting in the second objective (i.e., a deviation from the first objective in favor of the second objective) when resolving the instance. That is, without considering the second objective, the vehicle control actions of FIG. 7A would result. By including the second objective, at least some of the time, the vehicle control actions of FIG. 7B result when executing the instance.

In FIG. 7B, the autonomous vehicle is at position 710A at t=0. At belief state b, the available actions may include stop, edge, and go. In an example, the buffer value may be $\delta$=0.7. The vehicle control actions available for the second objective may be to stop past the stop sign without edging, and then go. The vehicle control actions available for the first objective may be to stop at the stop sign, edge, stop, and then go, as in FIG. 7A. But, the ability to consider the second objective (e.g., to minimize stops), may make additional vehicle control actions available for consideration to meet the first objective, such as stop past the stop sign without edging, and then go. The vehicle control actions may also include to stop at the stop sign, edge, stop, and then go. The vehicle control action(s) are selected such that the solution of the instance satisfies the constraint imposed by the buffer value. In the example of FIG. 7B, the autonomous vehicle stops past the stop sign at position 710B, and then goes without edging.

When there are more than two objectives, a respective buffer value can be associated with an objective. For example, where the multi-objective policy includes a third objective in addition to first and second objectives as described by the above examples, the multi-objective policy can also include a priority of the third objective relative to the first objective, the second objective, or both.

Figure 8:
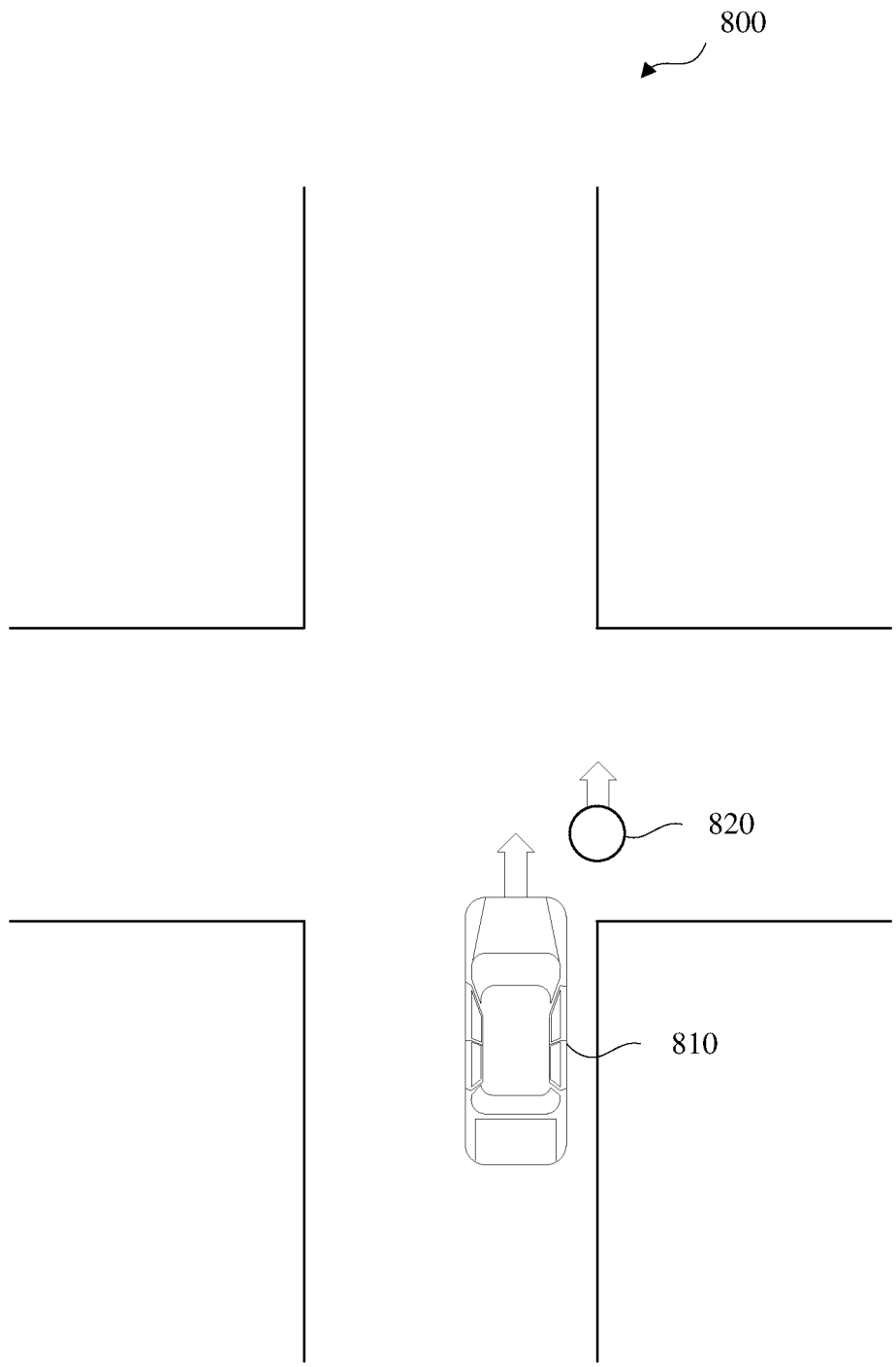
FIG. 8 is a diagram of an example of an intersection scene where an autonomous vehicle action is determined by leveraging the semantics of multi-objective reasoning.

An example of how a multi-objective policy with more than two objectives may be implemented is shown in FIG. 8. FIG. 8 is an example of an intersection scene 800 where an autonomous vehicle action is based on leveraging the semantics of multi-objective reasoning to explain, learn, and test different actions. As shown in this example, a vehicle 810 is passing through an intersection. A bicyclist 820 is in the intersection, and the vehicle 810 may pass the bicyclist 820 on the left at normal speed, edge past the bicyclist 820 on the left, or stop. In the absence of an express multi-objective policy in the decision-making process of the instance, a passenger, remote assistance or support, programmer, etc., may not be able to understand the objectives the autonomous vehicle is learning and what different actions may be considered.

In contrast, and regardless of which action is selected, the selected action may be explained using a multi-objective policy (TMDP or TPOMDP). In the example shown in FIG. 8, for example, the vehicle 810 may have a first objective to minimize the expected time to reach the other side of the intersection. A second objective may be to maximize a preferred behavior, in this example a preferred behavior of maintaining a relative position of the bicyclist 820 on the right by continuously monitoring the bicyclist 820. A third objective may be to minimize the risk of the autonomous vehicle 810 and the bicyclist 820 having an intersecting path.

In this example, the priority of the first objective relative to the second objective may include a first buffer value that indicates how many units, of the defined measurement unit, that the scenario-specific operational control evaluation model will allow deviation from the first objective in favor of the second objective, or the deviation from the second objective in favor of the first objective. A buffer value of $\delta$=0.7, similar to the example of FIG. 7B, places a higher priority on the first objective of quickly passing through the intersection as compared to the other objective, here the second objective of maximizing the preferred behavior.

The priority of the third objective may be stated relative to the second objective as a second buffer value in this example. The second buffer value may indicate how many units, of the defined measurement unit, that the scenario-specific operational control evaluation model will allow deviation from the third objective in favor of the second objective, or the deviation from the second objective in factor of the third objective. A second buffer value of $\delta$=0.1, similar to the example of FIG. 6, places a higher priority on the third objective minimizing risks as compared to the other objective, here the second objective of maximizing the preferred behavior. Because the first buffer value constrains the first objective in view of the second objective, and the second buffer value constrains the second objective in view of the third objective, the second buffer value may be considered as also constraining the first objective in view of the third objective.

At belief state b of the model instance, one or more vehicle control actions is determined by the instance in consideration of the first, second, and third objectives, so as to satisfy the constraints imposed by the first and second buffer values. At belief state b, the available actions of the autonomous vehicle may include stop, edge, and go. The first objective favors the vehicle control action of going without edging, the second objective favors the vehicle control action of edging, and the third objective favors the vehicle control action of stopping or edging. Assuming that the vehicle control action of edging is selected as satisfying the constraints imposed by the first buffer value and the second buffer value, the autonomous vehicle 810 edges past the bicyclist 820. By using the multi-objective policy in the decision for selecting vehicle control actions, the autonomous vehicle 810 can understand why an exploratory action is taken because that action is included as one of the objectives. Namely, edging is an exploratory action that allows the autonomous vehicle 810 to pass through the intersection and past the bicyclist 820 while continually determining what will happen, and if there is a better solution, such as for the aggressiveness/risk of the second objective.

Figure 9:
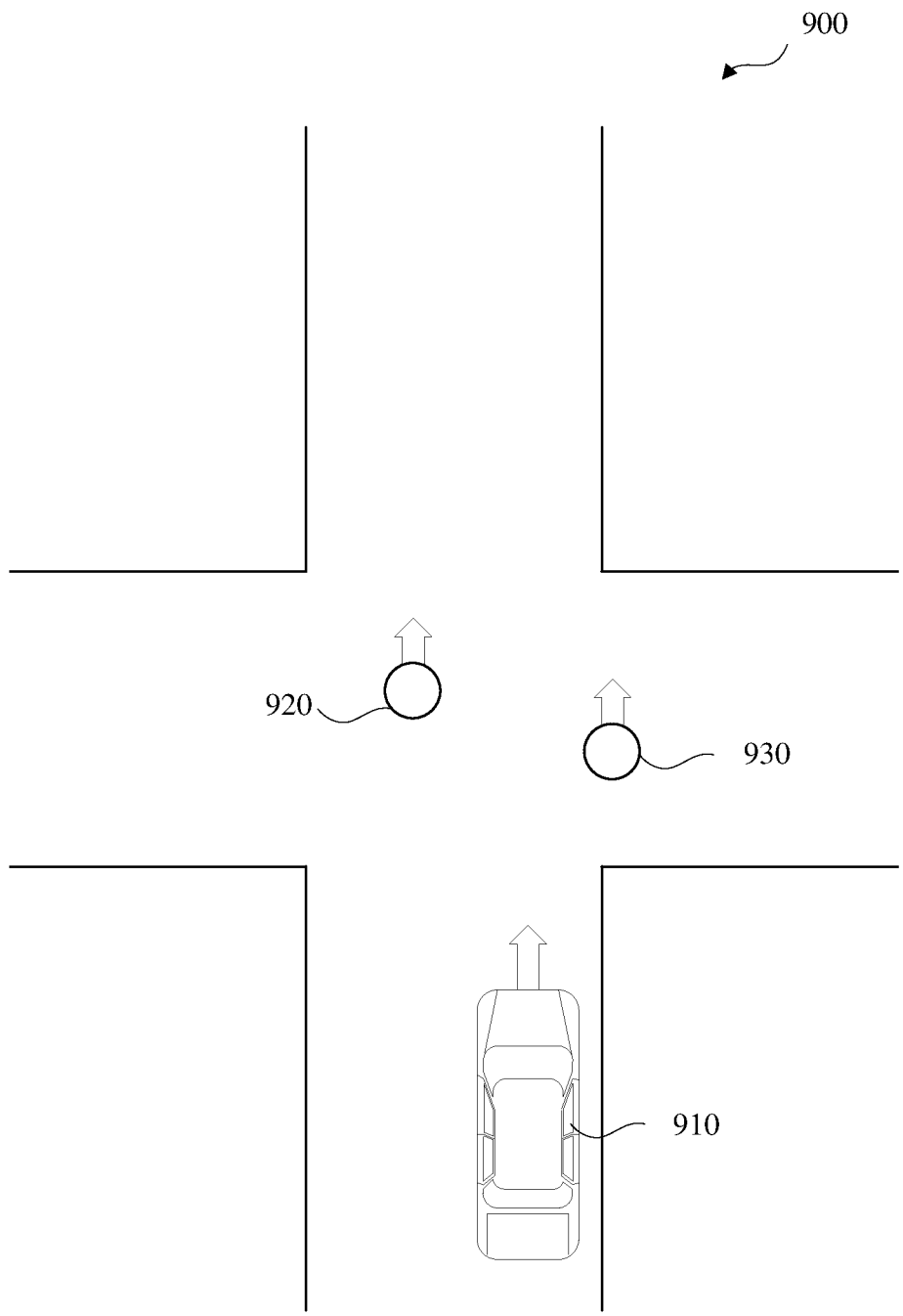
FIG. 9 is a diagram of an example of an intersection scene where an autonomous vehicle action is determined by integrating competence into multi-objective reasoning.

FIG. 8 describes an example where there are more than two objectives, and at least two buffer values. The multi-objective policy includes a priority of the second objective relative to the first objective (in this example the first buffer value), and a priority of the third objective relative to the second objective (in this example the second buffer value). In some examples, respective priorities of different objectives may be related to a single objective. This is shown by the example of FIG. 9, where the multi-objective policy includes a third objective in addition to first and second objectives. In this case, however, the multi-objective policy can also include a priority of the second objective relative to the first objective, and a priority of the third objective relative to the first objective. The priority of the third objective relative to the first objective can be indicated by a buffer value that indicates how many units, of a defined measurement unit, that the scenario-specific operational control evaluation model will allow deviation from the third objective in favor of the first objective. Similar to FIG. 8, the priority of the second objective relative to the first objective can be indicated by a buffer value that indicates how many units, of the defined measurement unit, that the scenario-specific operational control evaluation model will allow deviation from the second objective in favor of the first objective.

An example such as shown in FIG. 9, respective priorities of different objectives are related to a single objective. This arrangement of objectives may be used to balance competing objectives in view of a primary objective. The specific example of FIG. 9 can be used to explain integrating a competence measure into multi-objective reasoning. A competence measure may be a learned probability of success or failure. In this example, the competence measure may be incorporated into the state transition of the POMDP so that the executor may determine its own success or failure for each objective.

More specifically, in the diagram of an example of an intersection scene 900 of FIG. 9, an autonomous vehicle 910 is advancing towards the intersection while a bicyclist 920 and a bicyclist 930 are crossing the intersection. The autonomous vehicle may operate an instance of a scenario-specific operational control evaluation model that predicts the behavior each of the other the bicyclist 920 and the bicyclist 930 in the future up to a defined future time so as to select vehicle control actions for the autonomous vehicle. Assuming that the available actions are stop, edge, or go, and given a single objective, such as maximizing the probability of reaching the other side of the intersection without incident (e.g., minimizing time), the instance may conclude that each bicyclist 920, 930 is on a path that will not interfere with the autonomous vehicle. Accordingly, the autonomous vehicle enters the intersection.

In such an example, a human may make a different decision based on social acceptability. This is because the competence for this state (passing through the intersection with bicyclists 920, 930 to the left and right, respectively) and the go action is low with respect to riskiness, but is high with respect to social acceptability. Accordingly, and to implement learning for the state, asking a passenger or remote support for assistance may be a vehicle control action for this state, in addition to stop, edge, and go. Further, this reasoning may be considered in incorporating a multi-objective policy into the model by acknowledging that each objective has a difference notion of success and failure probabilistically with respect to that objective.

For example, while the first objective can be to minimize the expected time to reach the other side of the intersection, the second objective can be to minimize aggressiveness (and hence minimize the risk that the bicyclists 920, 930 and the autonomous vehicle 910 have interfering paths in the intersection). The priority of the first objective relative to the second objective can be represented by a first buffer value, such as $\delta=0.2$. This value may be used to indicate a constraint applied to the preference of the first objective relative to the second objective within the scenario-specific operational control evaluation model, and represents a low probability of favoring aggressiveness as compared to speed in determining vehicle control actions. The third objective is to maximize social acceptability of the selected vehicle control action. The priority of the third objective relative to the first objective can be represented by a second buffer value, such as $\delta=0.5$. This value may be used to indicate a constraint applied to the preference of the first objective relative to the third objective within the scenario-specific operational control evaluation model, and represents an equal probability of pursuing social acceptability as compared to speed in determining vehicle control actions.

Given the constraints applied to the first objective by the second and third objectives, the autonomous vehicle 910 may properly reason that its competence is low for a go action in view of social acceptability and restrict its action to asking approval. The ask approval action may request input from a user to approve one or more vehicle actions.

In the examples of FIGS. 6-9, the multi-objective policy is constant. That is, the first objective, the second objective, and, where applicable, the third objective are unchanged, as are the first buffer value and, where applicable, the second buffer value. As described in FIG. 5, however, a method for use with a vehicle traversing a vehicle transportation network can include updating 520 a multi-objective policy. For example, the multi-objective policy of FIG. 6 could be update by changing the first objective and the second objective (such as swapping the objectives by making the first objective minimizing the likelihood of interference and making the second objective minimizing the expected time), increasing or reducing the buffer value, or both. The multi-objective policies of FIGS. 7-9 may be similarly updated.

Figure 10:
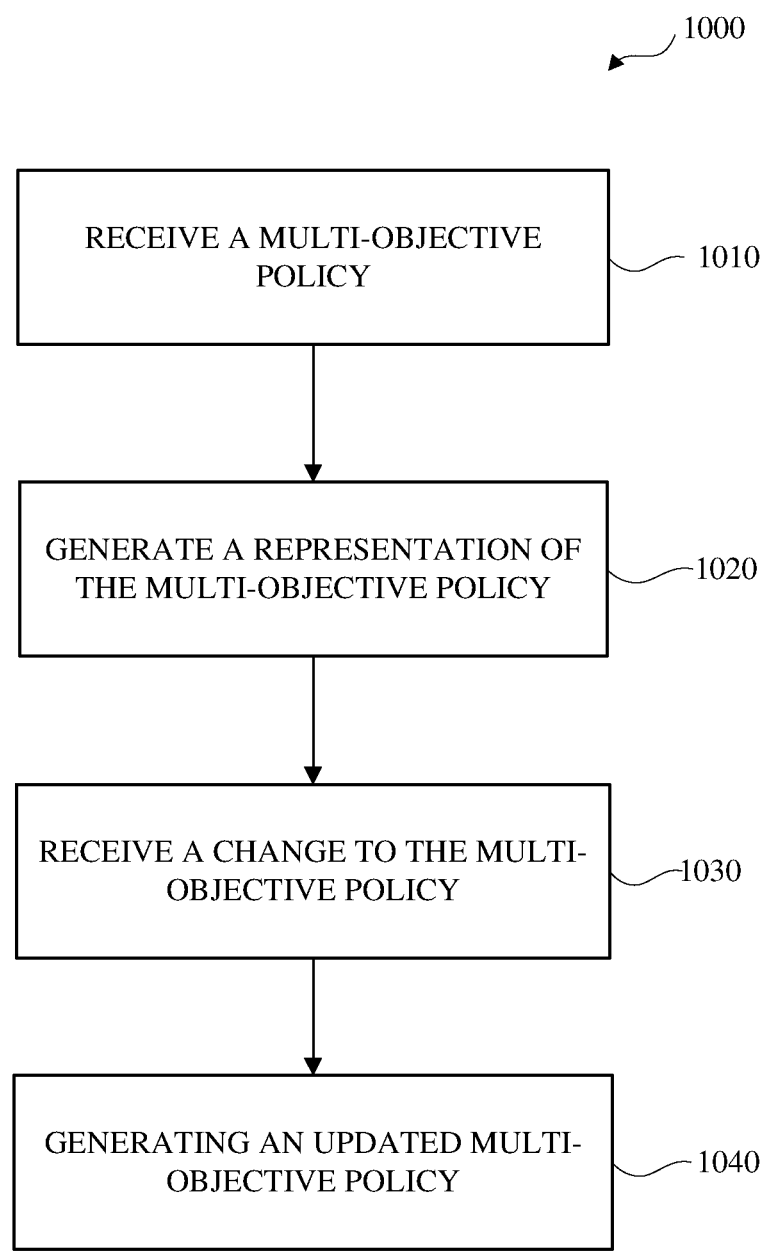
FIG. 10 is a flow diagram of an example method for updating a multi-objective policy as described in the method of FIG. 5.
Figure 11:
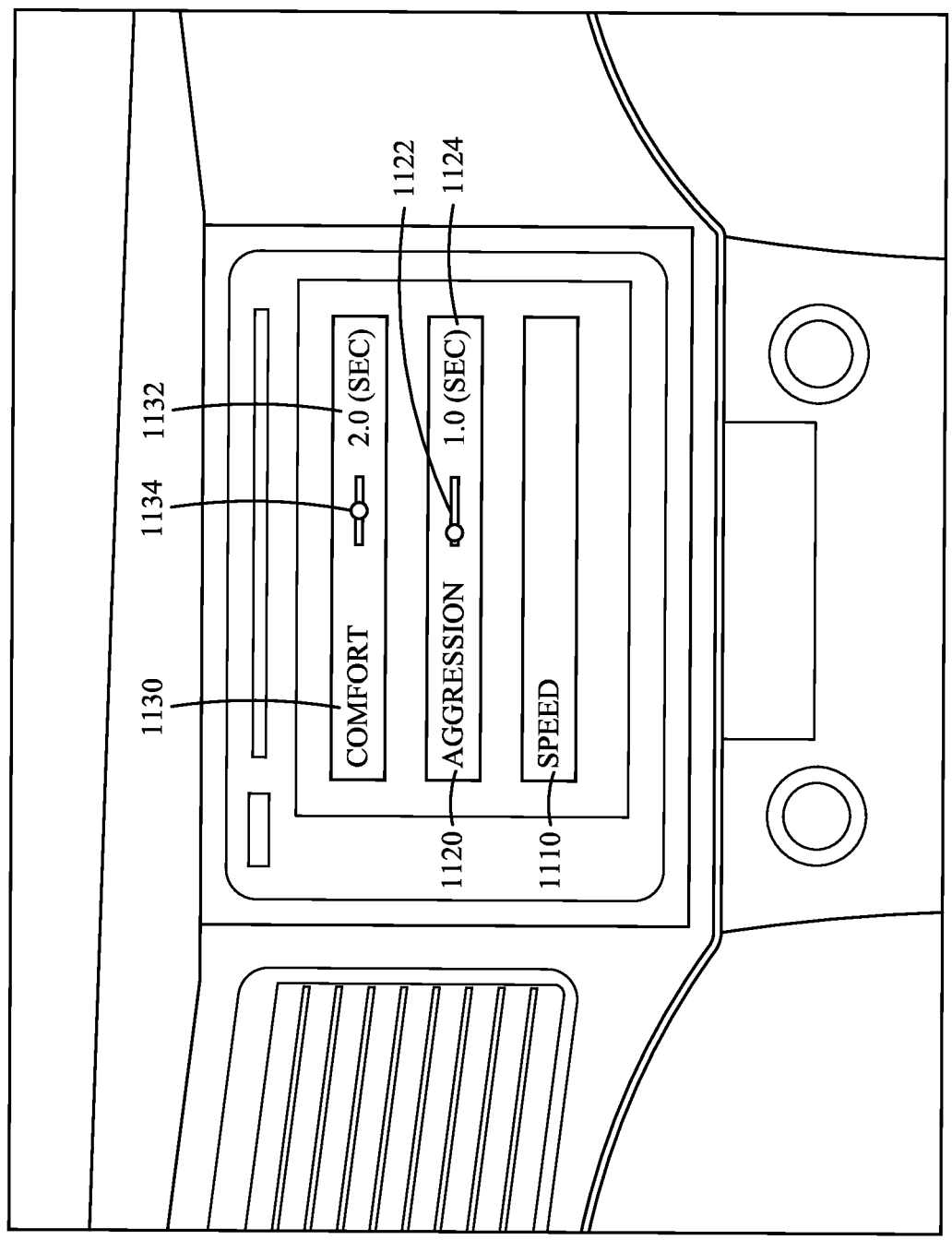
FIG. 11 is a diagram of a user interface used to explain the method of FIG. 10.
Figure 12:
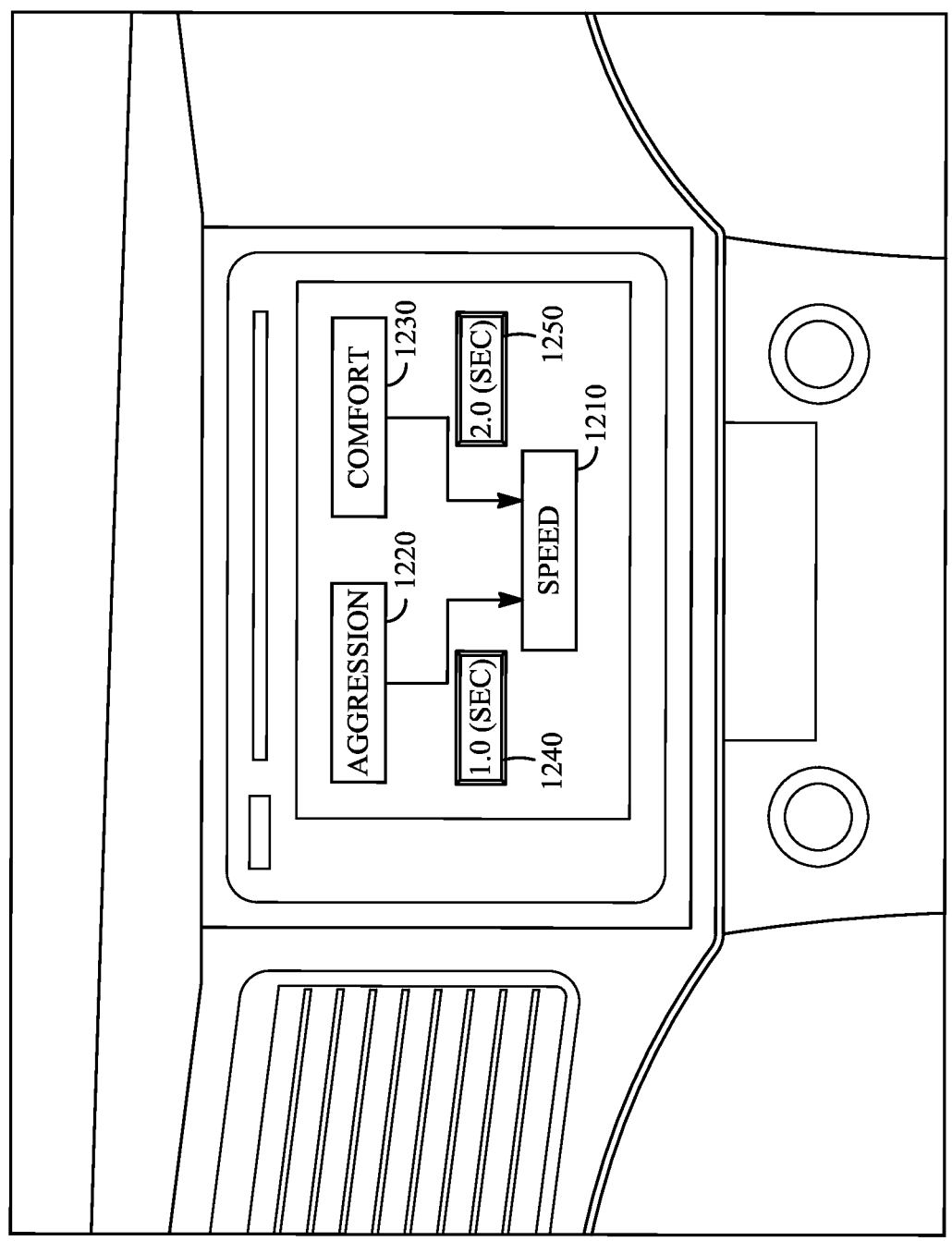
FIG. 12 is a diagram of another user interface used to explain the method of FIG. 10.
Figure 13:
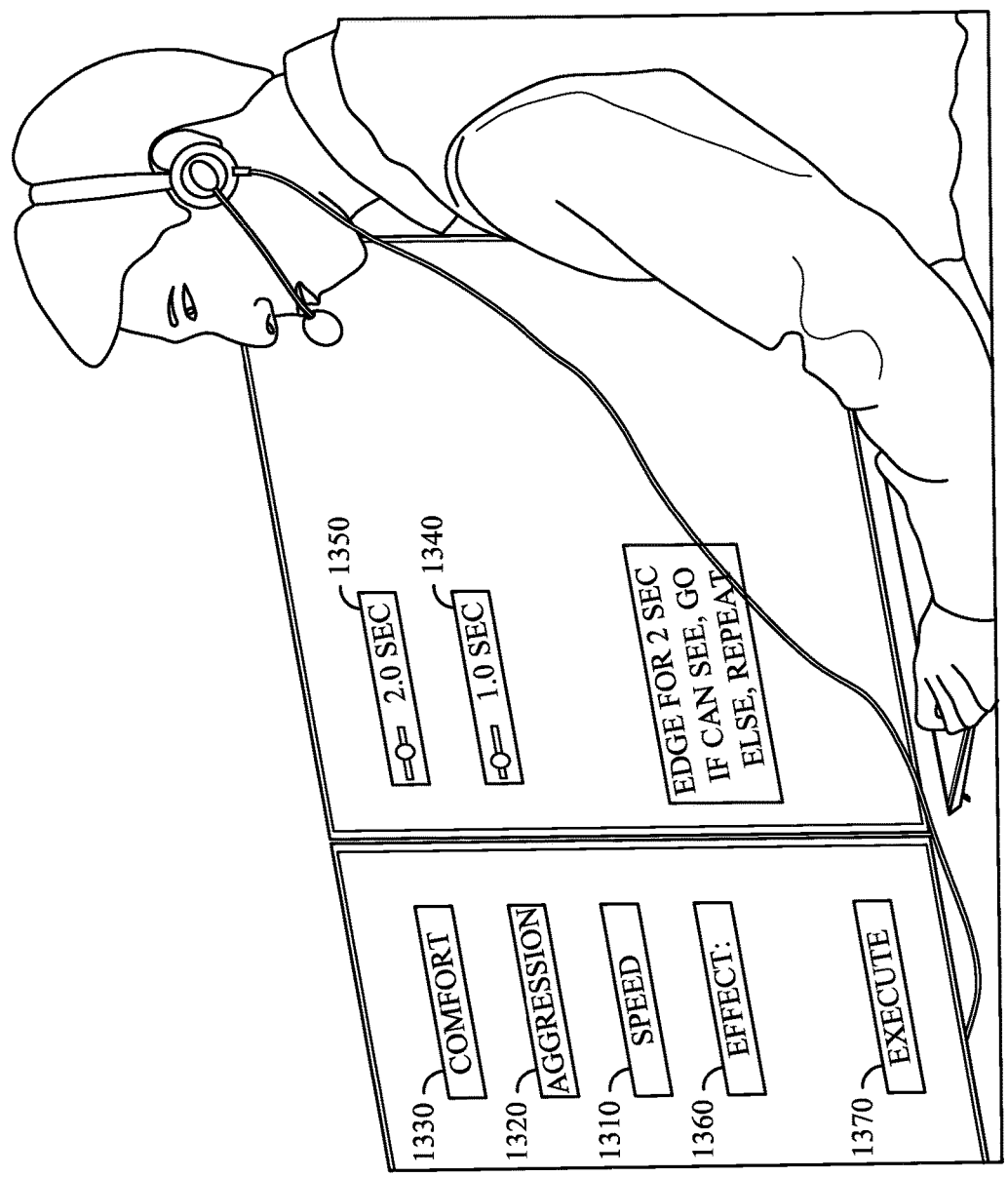
FIG. 13 is a diagram of another user interface used to explain the method of FIG. 10.

FIG. 10 is a flow diagram of an example method 1000 for updating a multi-objective policy that can be explained with further reference to FIGS. 11-13.

The method 1000 includes, at 1010, receiving a multi-objective policy for a scenario-specific operational control evaluation model. The multi-objective policy may be received from an instance of the scenario-specific operational control evaluation model of a distinct vehicle operational scenario. The multi-objective policy may be received at an autonomous vehicle, such as the autonomous vehicle 100, 210, or 211. The multi-objective policy may be received by a remote support center, such as by a control center incorporating the communication device 240.

The multi-objective policy may include a default multi-objective policy stored in association with the scenario-specific operational control evaluation model. The multi-objective policy may include a previously-updated multi-objective policy stored in association with the scenario-specific operational control evaluation model. Accordingly, the multi-objective policy may be received from memory at the autonomous vehicle, such as the memory 134, or memory of the remote support center.

Thereafter, a representation of the multi-objective policy is generated using a user interface at 1020. The multi-objective policy can include at least a first objective, a second objective, and a priority of the first objective relative to the second objective. As explained previously, the priority of the first objective relative to the second objective can comprise a preference for the first objective over the second objective. The multi-objective policy can include a buffer value indicating a constraint applied to the first objective in view of the second objective within the scenario-specific operational control evaluation model. This is further explained below with reference to FIGS. 11-13. Each of the examples of FIGS. 11-13 includes three objectives so as to show different combinations of priorities. Thus, the multi-policy objective includes a third objective, and also a priority of the third objective relative to at least one of the first objective or the second objective.

At 1030, based on feedback to the user interface, a change to the multi-objective policy for the scenario-specific operational control evaluation model is received. As described in additional detail below, the change to the policy can include a change of the first objective, a change of the second objective, a change in the priority of the first objective relative to the second objective, or any combination of these changes where two objectives are included in the multi-objective policy. Where three objectives are included in the multi-objective policy, the change to the policy can include a change of the first objective, a change of the second objective, a change of the third objective, a change in the priority of the first objective relative to the second objective, a change in the priority of the third objective relative to the first objective or the second objective, or any combination of these changes. Stated more generally, a change to the multi-objective policy can include a change to any of the objectives or a priority between any two objectives. How feedback is received is described below with regards to FIGS. 11-13.

After a change to the multi-objective policy is received at 1030, an updated multi-objective policy for the scenario-specific operational control evaluation model may be generated to include the change to the multi-objective policy at 1040. The updated multi-objective policy may be used for determining a vehicle control action for traversing the vehicle transportation network as described in the above examples.

In some implementations, the updated multi-objective policy may be stored, such as in the memory 134, remotely as further described below, or both, as the multi-objective policy for a subsequent instance of the scenario-specific operational control evaluation model of the distinct vehicle operational scenario.

A first example of a representation of the multi-objective policy generated at 1020 is shown in FIG. 11. In FIG. 11, the user interface comprises a user interface of an autonomous vehicle, such as the user interface 135. In this case, the user interface is a graphical user interface 1100. The representation comprises a first object 1110 representing the first objective and a second object 1120 representing the second objective. Here, a third objective is included in the multi-objective policy, and so the representation comprises a third object 1130 representing the third objective. An arrangement of the first object 1110 and the second object 1120 within the representation on the graphical user interface 1100 indicates the priority of the first objective relative to the second objective. Similarly, due to the inclusion of a third objective, the arrangement of the third object 1130 within the representation on the graphical user interface 1100 further indicates the priority of the third objective relative to at least one of the first objective or the second objective.

More specifically, in the arrangement of FIG. 11, the first object 1110, the second object 1120, and the third object 1130 are ordered within a list such that the first object 1110 is located at a bottom of the list, the second object 1120 is located above the first object 1110 within the list, and the third object 1130 is located above the second object within the list. This arrangement indicates that the first objective is constrained by the second objective, and the second objective is constrained by the third objective. Each of the objects 1110, 1120, 1130 can include a descriptor for the respective objective. In this example, the first objective is related to speed or time to complete a goal and has the descriptor "speed", the second objective is related to how aggressive the autonomous vehicle can act to achieve the goal and has the descriptor "aggression", and the third objective is related to the comfort of any passengers while achieving the goal and has the descriptor "comfort".

The priority can also include a buffer value as previously described. While the defined measurement unit of the buffer values in the above examples represent percentages, other units or combination of units are possible. In the example of FIGS. 11-13, the defined measurement unit is seconds. Accordingly, in FIG. 11, the first buffer value of 1.0 seconds indicates how many units, of the defined measurement unit, that the scenario-specific operational control evaluation model will allow deviation from the second objective in favor of the first objective, and the second buffer value of 2.0 seconds indicates how many units, of the defined measurement unit, that the scenario-specific operational control evaluation model will allow deviation from the third objective in favor of the second objective.

In this example, each of the first object 1110, the second object 1120, and the third object 1130 are drag-and-drop objects. Feedback in the form of moving any one of the objects within the graphical user interface constitutes a change in the multi-objective policy. For example, swapping the locations of the second object 1120 and the third object 1130 swaps the second objective and the third objective. That is, the "Comfort" objective becomes the second objective, and the "Aggression" objective becomes the third objective. It is also possible that one or more of the objects 1110, 1120, 1130 include pull-down menus that select an objective from a group of candidate objectives for association with a respective object. For example, the first objective and the second objective may be respective candidate objectives of the group. The pull-down menu may allow the change to the multi-objective policy for the scenario-specific operational control evaluation model to include hanging the first objective by changing the first objective to another candidate objective of the group, changing the second objective to another candidate objective of the group, changing a third objective, when present to another candidate objective of the group, adding a new objective from the group with a priority of the new objective relative another objective, removing an objective, or some combination of these changes.

The second object 1120 comprises not only a descriptor of the second objective, but also includes an identification 1122 of the first buffer value, and a first embedded object 1124 that, responsive to feedback (such as physical contact), changes the first buffer value. Similarly, the third object 1130 includes an identification 1132 of the second buffer value, and a second embedded object 1134 that, responsive to feedback, changes the second buffer value, in addition to a descriptor of the third objective.

In FIG. 11, the first embedded object 1124 and the second embedded object 1134 are sliders. Feedback in the form of movement of the slider to the left within the graphical user interface reduces a respective buffer value, while movement to the right increases a respective buffer value. A change in the first buffer value represents a change in the priority of the first objective relative to the second objective. A change in the second buffer value represents a change in the priority of the second objective relative to the third objective.

The instance of the scenario-specific operational control evaluation model using the multi-objective policy of FIG. 11 operates similar to the description of operation in FIG. 8. That is, the first buffer value constrains the first objective in view of the second objective, and the second buffer value constrains the second objective in view of the third objective, so the second buffer value also constrains the first objective in view of the third objective.

Instead of the priorities between objects being shown by ordering of a list as in FIG. 11, the priorities may be shown by another arrangement such as that shown in FIG. 12, which is a second example of a representation of the multi-objective policy generated at 1020.

Like FIG. 11, the user interface of FIG. 12 is a user interface of an autonomous vehicle, such as the user interface 135. In this case, the user interface is a graphical user interface 1200. The representation comprises a first object 1210 representing the first objective and a second object 1220 representing the second objective. Here, a third objective is included in the multi-objective policy, and so the representation comprises a third object 1230 representing the third objective. An arrangement of the first object 1210 and the second object 1220 within the representation on the graphical user interface 1200 indicates the priority of the first objective relative to the second objective. Similarly, due to the inclusion of a third objective, the arrangement of the third object 1230 within the representation on the graphical user interface 1200 further indicates the priority of the third objective relative to at least one of the first objective or the second objective.

In contrast to the arrangement of FIG. 11, however, the first object 1210, the second object 1220, and the third object 1230 are arranged so as to demonstrate that the first objective is constrained by the second objective, and the first objective is constrained by the third objective. In this example, a second buffer value indicates how many units, of the defined measurement unit, that the scenario-specific operational control evaluation model will allow deviation from the third objective in favor of the first objective, instead of in favor of the second objective as in FIG. 11.

More generally, the representation in FIG. 12 includes the second object 1220 and the third object 1230 adjacent to each other in a row in parallel with a top of the graphical user interface, and the first object 1210 located below the second object 1220 and the third object 1230. This graphically represents the priority of the first objective relative to the second objective, and the priority of the third objective relative to the first objective. The first object 1210, the second object 1220, and the third object 1230 are each drag-and-drop objects as shown, but they may be other objects than can be manipulated via feedback to change the multi-objective policy. For example, one or more of the objects 1210, 1220, 1230 may comprise pull-down menus. The objects 1210, 1220, 1230 respectively represent the same objectives of the objects 1110, 1120, 1130 for simplicity of explanation, and include the same descriptors of the objectives. The objects 1210, 1220, 1230 can represent other objectives in different implementations.

The representation of FIG. 12 could use objects representing objectives that are formed similarly to those in FIG. 11, that is, objects that include an embedded object (e.g., the embedded object 1124 of the second object 1120 or the embedded object 1134 of the third object 1130) that can be used to adjust the relative priority between two objectives of the multi-objective priority. However, FIG. 12 shows a different arrangement whereby the objects 1210, 1220, 1230 of respective objectives are not used to adjust the relative priority. Instead, the representation includes a fourth object 1240 that identifies the first buffer value and that, responsive to contact, changes the first buffer value. The fourth object 1240 is located between the first object 1210 and the second object 1220 within the graphical user interface 1200 to demonstrate that the fourth object 1240 indicates a relative priority between the two objectives associated with the objects 1210, 1220. The representation also includes a fifth object 1250 that identifies the second buffer value and that, responsive to contact, changes the second buffer value. The fifth object 1250 is located between the first object 1210 and the third object 1230 within the graphical user interface 1200 to demonstrate that the fifth object 1250 indicates a relative priority between the two objectives associated with the objects 1210, 1230.

Each of the fourth object 1240 and the fifth object 1250 in this example is a pull-down menu. That is, upon contact, a menu is displayed that includes possible new first buffer values or second buffer values as applicable. One or more of the objects 1240, 1250 could be a slider or other object that can be manipulated on the graphical user interface 1200 to change a value associated therewith and provide the value to a processor for inclusion in an updated multi-objective policy.

Other indicators of priority may be used in the representation of the multi-objective policy. For example, the representation of FIG. 12 includes an arrow directed from the second object 1220 to the first object 1210 and an arrow directed from the third object 1230 to the first object 1210 that shows the relative priority between the respective associate objectives.

The instance of the scenario-specific operational control evaluation model using the multi-objective policy of FIG. 12 operates similar to the description of operation in FIG. 9. That is, the first buffer value constrains the first objective in view of the second objective, and the second buffer value constrains the first objective in view of the third objective.

FIGS. 11 and 12 illustrate how a user in an autonomous vehicle can use a user interface, such as a graphical user interface 1100, 1200, generate the multi-objective policy and to make changes to their preferences for multi-objective control of the vehicle. The user interface may include other different components. For example, instead of a graphical user interface with a touch screen as described, the user interface may comprise an interface or display that otherwise receives input from an input device. The input device in this implementation and in others may be a microphone, for example. The processor, such as the processor 133, can receive a change to the multi-objective policy from a verbal command to the microphone. In some implementations, the user interface can be or include a speaker. Where a speaker is used, the representation of the multi-objective policy can be a sentence or sentence fragment that identifies the objectives and the one or more priorities between the objectives, whose number depend on the number of objectives. For example, a (e.g., auditory) representation of the multi-objective policy of FIG. 11 could be: "current settings indicate a willingness to sacrifice 2.0 seconds of the comfort objective in favor of the aggression objective and a willingness to sacrifice 1.0 seconds of the aggression objective in factor of the speed objective." A change to the multi-objective policy may be made by a verbal or touch command to another input device.

FIG. 13 is a diagram of another user interface used to explain the method of FIG. 10. The user interface of FIG. 13 is also a graphical user interface 1300, and presents a representation of the same multi-objective policy of FIG. 11. Namely, a first object 1310, a second object 1320, and a third object 1330 are ordered within a list such that the first object 1310 is located at a bottom of the list, the second object 1320 is located above the first object 1310 within the list, and the third object 1330 is located above the second object 1320 within the list. This arrangement indicates that the first objective, represented by the first object 1310, is constrained by the second objective, represented by the second object 1320, and the second objective is constrained by the third objective, represented by the third object 1330. Each of the objects 1310, 1320, 1330 include a descriptor for the respective objective, similarly to FIG. 11.

Instead of embedded objects of the second object 1320 and the third object 1330 providing the ability to change the relative priority of between two objectives (i.e., the first and second objectives and the second and third objectives, respectively), a fourth object 1340 and a fifth object 1350 are used. Instead of pull-down menus as in the example of FIG. 12, the fourth object 1340 and the fifth object 1350 are each sliders that operate as described with regards to the sliders 1124, 1134 to change respective buffer values. That is, the fourth object 1340 can be used to change a first buffer value that indicates how many units, of the defined measurement unit, that the scenario-specific operational control evaluation model will allow deviation from the second objective in favor of the first objective. Similarly, the fourth object 1340 can be used to change a second buffer value that indicates how many units, of the defined measurement unit, that the scenario-specific operational control evaluation model will allow deviation from the third objective in favor of the second objective.

Unlike either FIG. 11 or 12, the graphical user interface 1300 is not a user interface of a vehicle. Instead, it is the user interface of a remote support device for a vehicle. The remote support device includes a wireless communications device, and a memory storing the multi-objective policy. The method 1000 can be performed by a processor of the remote support device, such as in response to a request for assistance from the vehicle through the wireless communications device. In this example, the multi-objective policy can be received at 1010 from the memory responsive to the request. After the representation is generated at 1020, and a change for the multi-objective policy is received at 1030 in a similar manner as described with regards to FIGS. 11 and 12, the updated multi-objective policy generated at 1040 may be used to determine the vehicle control action responsive to the updated multi-objective policy for the scenario-specific operational control evaluation model. The vehicle control action that is determined using the updated multi-objective policy may be presented using the user interface 1300. In FIG. 13, the vehicle control action 1360 is displayed on the user interface 1300 with the label "Effect."

The remote support device can receive a variety of changes to the multi-objective policy and present the resulting vehicle control actions until a vehicle control action 1360 satisfactory to the user of the remote support device is reached. Once this occurs, the remote support device can transmit an instruction to the vehicle to execute the vehicle control action 1360 (e.g., using the wireless communication device). In the example of FIG. 13, this instruction is sent by activating the object 1370. In some implementations, the remote support device can instead send the multi-objective policy to the vehicle for use as an updated multi-objective policy of an instance of the scenario-specific operational control evaluation model being executed locally.

In the above description, the remote support device is providing assistance to a vehicle (e.g., in real-time) using an instance of a scenario-specific operational control evaluation model. The user interface of FIG. 13 may also be used at the remote support device for other applications. For example, any of the user interfaces described herein may be used to control preferences of a fleet managed by the remote support device, such as for differences in regions or in the use of fleet vehicles. In this example, where at least some vehicles of a fleet are taxis, the multi-objective policy could be set once at the remote support device, such as using the graphical user interface 1300, to raise the priority of the comfort objective relative to one or more other objectives. Each of the relevant fleet vehicles can then receive the multi-objective policy from the remote support device for use each time an instance of a scenario-specific operational control evaluation model is initiated.

A user interface such as that shown in FIG. 13, either with or without the object 1370, can be used by a developer. For example, a developer may use the graphical user interface 1300 to tune preference ordering and buffer values for various scenario-specific operational control evaluation models when designing or modifying an autonomous vehicle.

Although described herein with reference to an autonomous vehicle, the methods and apparatus described herein may be implemented with any vehicle capable of autonomous or semi-autonomous operation. Although described with reference to a vehicle transportation network, the method and apparatus described herein may include the autonomous vehicle operating in any area navigable by the vehicle.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use with a vehicle in traversing a vehicle transportation network, the method comprising:
   receiving, from an instance of a scenario-specific operational control evaluation model of a distinct vehicle operational scenario, a multi-objective policy for the scenario-specific operational control evaluation model, wherein the multi-objective policy includes at least a first objective, a second objective, and a priority of the first objective relative to the second objective;
   generating, using a user interface, a representation of the first objective, the second objective, and the priority of the first objective relative to the second objective;
   receiving, based on feedback to the user interface, a change to the multi-objective policy for the scenario-specific operational control evaluation model, the change including at least one of a change of the first objective, a change of the second objective, or a change in the priority of the first objective relative to the second objective; and
   generating, for determining a vehicle control action for traversing the vehicle transportation network, an updated multi-objective policy for the scenario-specific operational control evaluation model to include the change to the multi-objective policy.

2. The method of claim 1, wherein the priority of the first objective relative to the second objective comprises a preference for the first objective over the second objective and a buffer value indicating a constraint applied to the preference within the scenario-specific operational control evaluation model.

3. The method of claim 2, wherein:
   the buffer value indicates how many units, of a defined measurement unit, that the scenario-specific operational control evaluation model will allow deviation from the second objective in favor of the first objective, and
   a change in the priority of the first objective relative to the second objective comprises a change to the buffer value.

4. The method of claim 3, wherein the defined measurement unit comprises seconds.

5. The method of claim 1, wherein:
   the user interface comprises a graphical user interface,
   the representation comprises a first object representing the first objective and a second object representing the second objective, and
   an arrangement of the first object and the second object within the representation on the graphical user interface indicates the priority of the first objective relative to the second objective.

6. The method of claim 5, wherein:
   the multi-objective policy includes a third objective, and a priority of the third objective relative to at least one of the first objective or the second objective,
   the representation comprises a third object representing the third objective, and
   the arrangement within the representation on the graphical user interface further indicates the priority of the third objective relative to at least one of the first objective or the second objective.

7. The method of claim 6, wherein:
   the priority of the first objective relative to the second objective includes a first buffer value that indicates how many units, of a defined measurement unit, that the scenario-specific operational control evaluation model will allow deviation from the second objective in favor of the first objective,
   the priority of the third objective relative to at least one of the first objective or the second objective includes a second buffer value that indicates one of:
   how many units, of the defined measurement unit, that the scenario-specific operational control evaluation model will allow deviation from the third objective in favor of the first objective, or
   how many units, of the defined measurement unit, that the scenario-specific operational control evaluation model will allow deviation from the third objective in favor of the second objective.

8. The method of claim 7, wherein:
   the second buffer value indicates how many units, of the defined measurement unit, that the scenario-specific operational control evaluation model will allow deviation from the third objective in favor of the second objective, and the arrangement comprises:

the first object, the second object, and the third object ordered within a list such that the first object is located at a bottom of the list, the second object is located above the first object within the list, and the third object is located above the second object within the list.

9. The method of claim 8, wherein:

the first object comprises a descriptor of the first objective, the second object comprises a descriptor of the second objective, identification of the first buffer value, and a first embedded object that, responsive to contact, changes the first buffer value, and the third object comprises a descriptor of the third objective, identification of the second buffer value, and a second embedded object that, responsive to contact, changes the second buffer value.

10. The method of claim 7, wherein:

the second buffer value indicates how many units, of the defined measurement unit, that the scenario-specific operational control evaluation model will allow deviation from the third objective in favor of the first objective, and the arrangement comprises:

the second object and the third object adjacent to each other in a row in parallel with a top of the graphical user interface, and the first object located below the second object and the third object.

11. The method of claim 10, wherein:

the first object comprises a descriptor of the first objective, the second object comprises a descriptor of the second objective, identification of the first buffer value, and a first embedded object that, responsive to contact, changes the first buffer value, and the third object comprises a descriptor of the third objective, identification of the second buffer value, and a second embedded object that, responsive to contact, changes the second buffer value.

12. The method of claim 10, wherein:

the first object comprises a descriptor of the first objective, the second object comprises a descriptor of the second objective, the third object comprises a descriptor of the third objective, and the representation includes:

an arrow directed from the second object to the first object, a fourth object that identifies the first buffer value and that, responsive to contact, changes the first buffer value, an arrow directed from the third object to the first object, and a fifth object that identifies the second buffer value and that, responsive to contact, changes the second buffer value.

13. An apparatus for use with a vehicle traversing a vehicle transportation network, the apparatus comprising:

a user interface; and a processor configured to:

receive, from an instance of a scenario-specific operational control evaluation model of a distinct vehicle operational scenario, a multi-objective policy for the scenario-specific operational control evaluation model, wherein the multi-objective policy includes at least a first objective, a second objective, and a priority of the first objective relative to the second objective;

generate, using the user interface, a representation of the first objective, the second objective, and the priority of the first objective relative to the second objective;

receive, based on feedback to the user interface, a change to the multi-objective policy for the scenario-specific operational control evaluation model, the change including at least one of a change of the first objective, a change of the second objective, or a change in the priority of the first objective relative to the second objective; and generate, for determining a vehicle control action for traversing the vehicle transportation network, an updated multi-objective policy for the scenario-specific operational control evaluation model to include the change to the multi-objective policy.

14. The apparatus of claim 13, further comprising:

a wireless communications device; and a memory storing the multi-objective policy, wherein the processor is configured to:

receive the multi-objective policy from the memory responsive to a request, through the wireless communications device, for assistance from the vehicle, present the vehicle control action that is determined using the updated multi-objective policy using the user interface, and transmit an instruction to the vehicle to execute the vehicle control action.

15. The apparatus of claim 14, wherein the processor is configured to:

store the updated multi-objective policy as the multi-objective policy for a subsequent instance of the scenario-specific operational control evaluation model of the distinct vehicle operational scenario.

16. The apparatus of claim 13, wherein the user interface comprises a speaker, and the representation is a sentence that identifies the first objective, the second objective, and the priority of the first objective relative to the second objective.

17. The apparatus of claim 16, wherein the user interface comprises a microphone, and the processor is configured to receive the change from a verbal command to the microphone.

18. The apparatus of claim 13, wherein:

the user interface comprises a graphical user interface, the representation comprises a first object displayed on the graphical user interface representing the first objective and a second object displayed on the graphical user interface representing the second objective, the first object is a drag-and-drop object and includes a descriptor of the first objective, the second object is a drag-and-drop object and includes a descriptor of the second objective, an arrangement of the first object and the second object within the representation on the graphical user interface indicates the priority of the first objective relative to the second objective, the priority of the first objective relative to the second objective includes a first buffer value that indicates how many units, of a defined measurement unit, that the scenario-specific operational control evaluation model will allow deviation from the second objective in favor of the first objective, and the representation comprises a third object associated with the first buffer value, wherein the third object is one of a pull-down menu or a slider that changes the first buffer value responsive to contact with the graphical user interface.

19. The apparatus of claim 13, wherein:
the first objective is a first candidate objective of a group of candidate objectives,
the second objective is a second candidate objective of the group of candidate objectives, and
the change to the multi-objective policy for the scenario-specific operational control evaluation model comprises at least one of changing the first objective by changing the first candidate objective to another candidate objective of the group of candidate objectives, changing the second objective to another candidate objective of the group of candidate objectives, adding a third objective from the group of candidate objectives with a priority of the third objective relative to at least one of the first objective or the second objective, or the change in the priority of the first objective relative to the second objective.

20. An autonomous vehicle, comprising:
a user interface comprising at least one of:
a graphical user interface; or
a microphone and a speaker; and
a processor configured to:
receive, from an instance of a scenario-specific operational control evaluation model of a distinct vehicle operational scenario, a multi-objective policy for the scenario-specific operational control evaluation model, wherein:
the multi-objective policy includes at least a first objective, a second objective, and a priority of the first objective relative to the second objective,
the priority of the first objective relative to the second objective comprises a preference for the first objective over the second objective and a buffer value indicating a constraint applied to the preference within the scenario-specific operational control evaluation model, and
the buffer value indicates how many units, of a defined measurement unit, that the scenario-specific operational control evaluation model will allow deviation from the second objective in favor of the first objective;
generate, using the user interface, a representation of the first objective, the second objective, and the priority of the first objective relative to the second objective;
receive, based on feedback to the user interface, a change to the multi-objective policy for the scenario-specific operational control evaluation model, the change including at least one of a change of the first objective, a change of the second objective, or a change in the priority of the first objective relative to the second objective; and
generate, for determining a vehicle control action for traversing a vehicle transportation network, an updated multi-objective policy for the scenario-specific operational control evaluation model to include the change to the multi-objective policy.

* * * * *